United States Patent
Ishiga

(10) Patent No.: US 8,369,651 B2
(45) Date of Patent: *Feb. 5, 2013

(54) IMAGE PROCESSING APPARATUS AND IMAGE PROCESSING PROGRAM

(75) Inventor: Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/222,842

(22) Filed: Aug. 31, 2011

(65) Prior Publication Data

US 2012/0013772 A1    Jan. 19, 2012

Related U.S. Application Data

(62) Division of application No. 12/640,603, filed on Dec. 17, 2009, now Pat. No. 8,031,968, which is a division of application No. 10/540,972, filed as application No. PCT/JP03/16797 on Dec. 25, 2003, now Pat. No. 7,853,097.

(30) Foreign Application Priority Data

| Dec. 27, 2002 | (JP) | 2002-379719 |
| Dec. 27, 2002 | (JP) | 2002-379720 |
| Dec. 27, 2002 | (JP) | 2002-379721 |
| Aug. 29, 2003 | (JP) | 2003-307355 |
| Aug. 29, 2003 | (JP) | 2003-307356 |
| Aug. 29, 2003 | (JP) | 2003-307357 |

(51) Int. Cl.
*G06K 9/40* (2006.01)

(52) U.S. Cl. ........ 382/275; 348/247; 348/251; 348/615; 382/149; 382/274

(58) Field of Classification Search .......... 382/144, 382/145, 275, 149, 167, 274; 348/247, 251, 348/615

See application file for complete search history.

(56) References Cited

U.S. PATENT DOCUMENTS

| 4,982,233 A | 1/1991 | Lehman et al. |
| 5,266,805 A | 11/1993 | Edgar |
| 5,694,228 A | 12/1997 | Peairs et al. |
| 5,884,296 A * | 3/1999 | Nakamura et al. ............. 706/20 |
| 5,920,344 A | 7/1999 | Kim |
| 6,035,072 A | 3/2000 | Read |
| 6,075,590 A | 6/2000 | Edgar |
| 6,123,334 A | 9/2000 | Norris |
| 6,125,213 A | 9/2000 | Morimoto |
| 6,195,161 B1 | 2/2001 | Edgar |
| 6,388,706 B1 * | 5/2002 | Takizawa et al. ............. 348/273 |
| 6,529,618 B1 | 3/2003 | Ohara et al. |
| 6,529,625 B2 | 3/2003 | Sentoku et al. |
| 6,603,878 B1 * | 8/2003 | Takemoto ..................... 382/167 |

(Continued)

FOREIGN PATENT DOCUMENTS

| EP | 0 687 106 A1 | 12/1995 |
| EP | 1 003 332 A2 | 5/2000 |

(Continued)

OTHER PUBLICATIONS

English-language translation of Japanese Office Action issued in Japan Patent Application No. 2003-307356, mailed Nov. 10, 2009.

(Continued)

*Primary Examiner* — Gregory M Desire
(74) *Attorney, Agent, or Firm* — Oliff & Berridge, PLC

(57) ABSTRACT

An image processing apparatus includes: an image obtaining unit that obtains a photographic image captured with an image sensor; a flat portion extraction unit that extracts a flat portion area within the photographic image having been obtained; and a defect information generating unit that generates defect information corresponding to the extracted flat portion area.

22 Claims, 15 Drawing Sheets

U.S. PATENT DOCUMENTS

| | | |
|---|---|---|
| 6,683,643 B1 | 1/2004 | Takayama et al. |
| 6,791,608 B1 | 9/2004 | Miyazawa |
| 6,868,190 B1 * | 3/2005 | Morton .......................... 382/278 |
| 6,879,392 B2 | 4/2005 | Sakai et al. |
| 6,888,958 B1 * | 5/2005 | Sawa et al. .................... 382/144 |
| 6,950,133 B2 | 9/2005 | Yoshiwara et al. |
| 6,987,892 B2 | 1/2006 | Edgar |
| 6,990,213 B2 * | 1/2006 | Donescu ....................... 382/100 |
| 7,142,294 B2 | 11/2006 | Shibata et al. |
| 7,248,366 B2 | 7/2007 | Uesugi et al. |
| 2001/0010552 A1 | 8/2001 | Nakajima |
| 2002/0003908 A1 | 1/2002 | Kijima et al. |
| 2002/0093577 A1 | 7/2002 | Kitawaki et al. |
| 2002/0126910 A1 | 9/2002 | Gindele et al. |
| 2002/0159649 A1 | 10/2002 | Mollov et al. |
| 2002/0176013 A1 | 11/2002 | Itoh |
| 2002/0196354 A1 | 12/2002 | Chang et al. |
| 2003/0063203 A1 | 4/2003 | Ohno |
| 2003/0146975 A1 | 8/2003 | Joung et al. |
| 2003/0193011 A1 | 10/2003 | Takeda |
| 2004/0091142 A1 | 5/2004 | Peterson et al. |
| 2004/0114827 A1 | 6/2004 | Chizawa et al. |
| 2004/0201757 A1 * | 10/2004 | Okada .......................... 348/241 |
| 2005/0058362 A1 | 3/2005 | Kita |
| 2005/0068445 A1 | 3/2005 | Steinberg et al. |

FOREIGN PATENT DOCUMENTS

| | | |
|---|---|---|
| EP | 1 250 000 A2 | 10/2002 |
| JP | 06-038113 A | 2/1994 |
| JP | H06-245148 A | 9/1994 |
| JP | 09-51459 A | 2/1997 |
| JP | 10-157081 A | 6/1998 |
| JP | 10-294870 A | 11/1998 |
| JP | 10-322603 A | 12/1998 |
| JP | 11-027475 A | 1/1999 |
| JP | 11-113012 A | 4/1999 |
| JP | 11-239298 A | 8/1999 |
| JP | 2000-020691 A | 1/2000 |
| JP | 2000-217039 A | 8/2000 |
| JP | 2000-295532 A | 10/2000 |
| JP | 2000-312314 A | 11/2000 |
| JP | 2000-358195 A | 12/2000 |
| JP | 2001-000427 A | 1/2001 |
| JP | 2001-016599 A | 1/2001 |
| JP | 2001-57656 A | 2/2001 |
| JP | 2001-086411 A | 3/2001 |
| JP | 2002-101342 A | 4/2002 |
| JP | 2002-209147 A | 7/2002 |
| JP | 2002-247445 A | 8/2002 |
| JP | 2002-354340 A | 12/2002 |
| JP | 2003-101872 A | 4/2003 |
| JP | 2003-189189 A | 7/2003 |
| JP | 2003-304548 A | 10/2003 |
| JP | 2003-338926 A | 11/2003 |

OTHER PUBLICATIONS

U.S. Office Action, mailed Apr. 2, 2010, in U.S. Appl. No. 10/540,972.

Notice of Allowance for U.S. Appl. No. 10/540,972, mailed Aug. 26, 2010.

European Office Action issued in European Patent Application No. 03 768 277.0 mailed Dec. 14, 2010.

U.S. Office Action, mailed Dec. 28, 2010, in U.S. Appl. No. 12/640,603.

Notice of Allowance in U.S. Appl. No. 12/640,603 mailed Jul. 13, 2011.

European Office Action dated Apr. 20, 2012 for European Patent Application No. 03 768 277.0.

European Search Report dated Apr. 23, 2012 for European Patent Application No. 12 157 353.9.

* cited by examiner

FIG.8
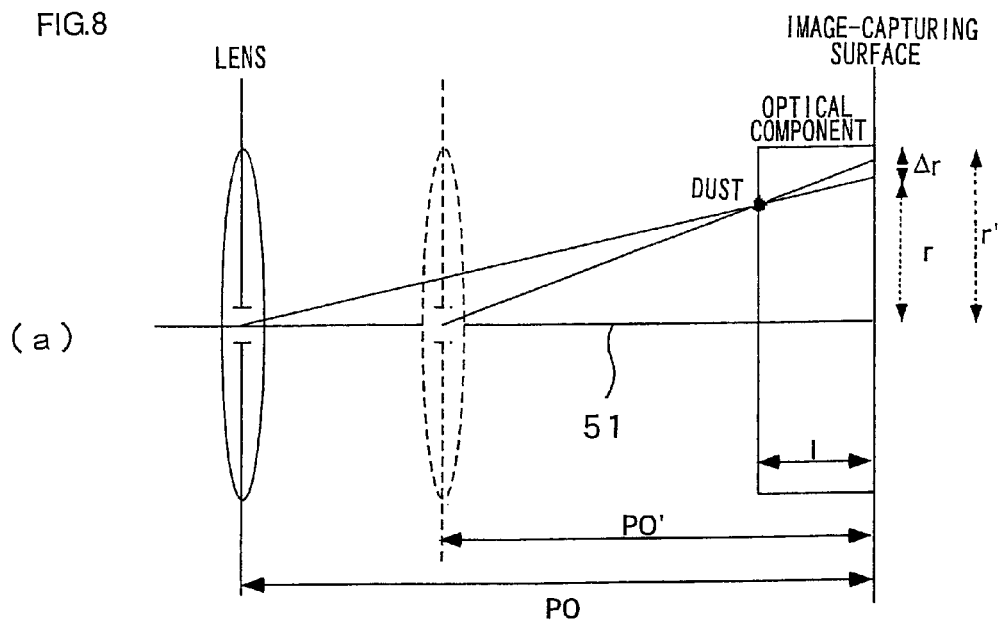
(a)
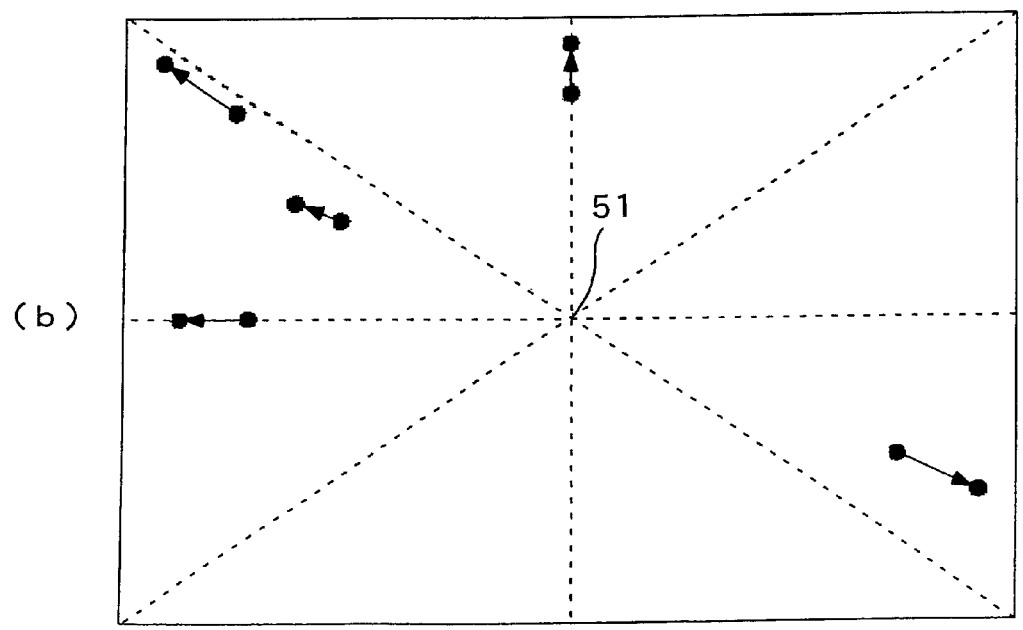
(b)
BEFORE DISPLACEMENT: PUPIL POSITION PO
AFTER DISPLACEMENT: PUPIL POSITION PO'
WITH PO > PO'

FIG.9
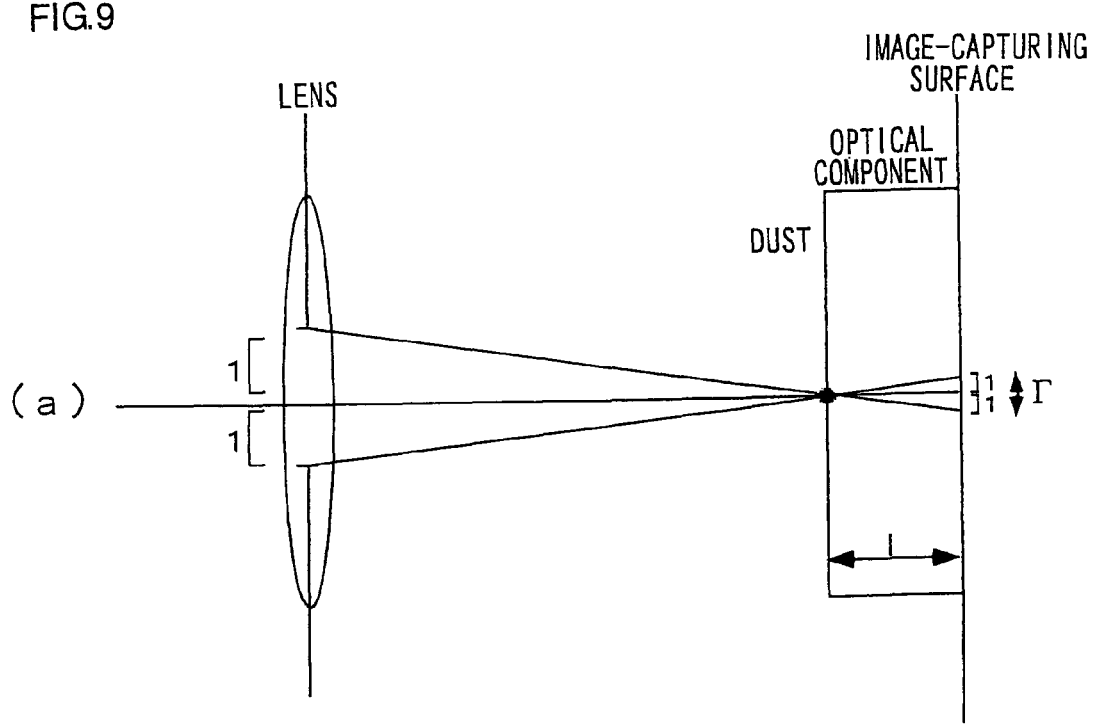
(a)
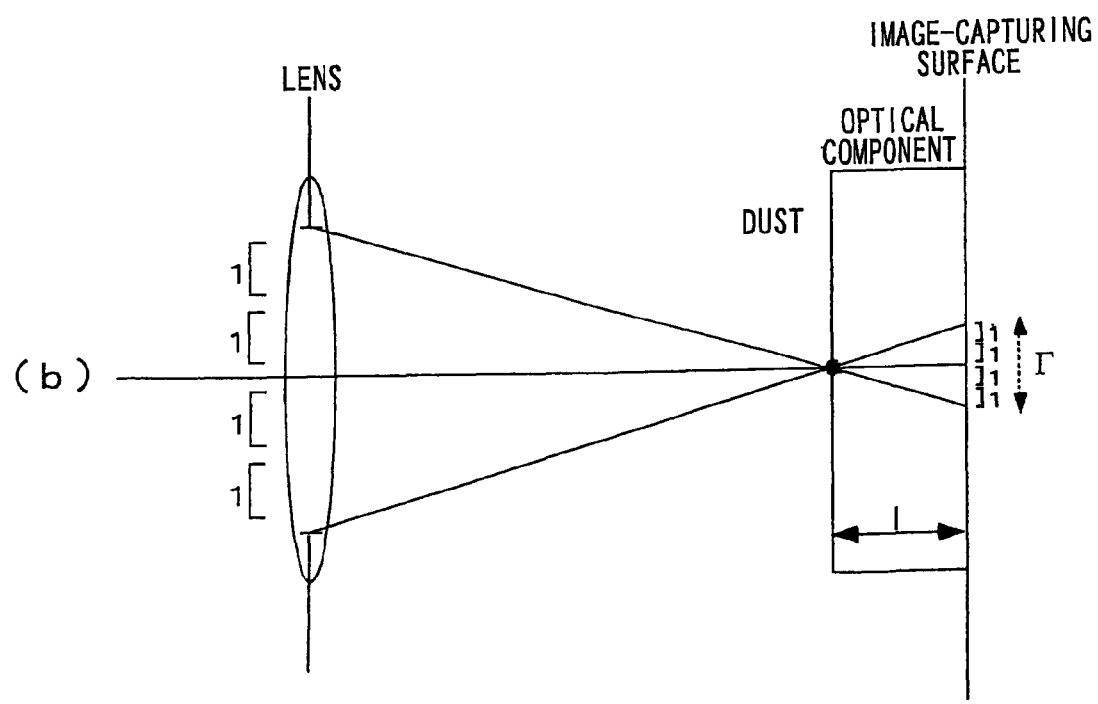
(b)

FIG.10

| APERTURE VALUE | DUST DIAMETER r [pixel] | LPF SIZE | ONE DIMENSIONAL FILTER COEFFICIENTS |
|---|---|---|---|
| F22 | 4.5 | NOT NECESSARY TO EXECUTE CONVERSION PROCESSING | |
| F16 | 6.3 | 6x6 | [0.5, 1, 1, 1, 1, 1, 0.5]/6 |
| F11 | 9.1 | 9x9 | [1, 1, 1, 1, 1, 1, 1, 1, 1]/9 |
| F8 | 12.5 | 13x13 | [1, 1, 1, ......, 1, 1, 1]/13 |
| F5.6 | 17.9 | 18x18 | [0.5, 1, 1, ......, 1, 1, 0.5]/18 |
| F4 | 25.0 | 25x25 | [1, 1, 1, ......, 1, 1, 1]/25 |

FIG.11

| 0.25 | 0.5 | 0.5 | 0.5 | 0.5 | 0.5 | 0.25 |
|---|---|---|---|---|---|---|
| 0.5 | 1 | 1 | 1 | 1 | 1 | 0.5 |
| 0.5 | 1 | 1 | 1 | 1 | 1 | 0.5 |
| 0.5 | 1 | 1 | 1 | 1 | 1 | 0.5 |
| 0.5 | 1 | 1 | 1 | 1 | 1 | 0.5 |
| 0.5 | 1 | 1 | 1 | 1 | 1 | 0.5 |
| 0.25 | 0.5 | 0.5 | 0.5 | 0.5 | 0.5 | 0.25 |

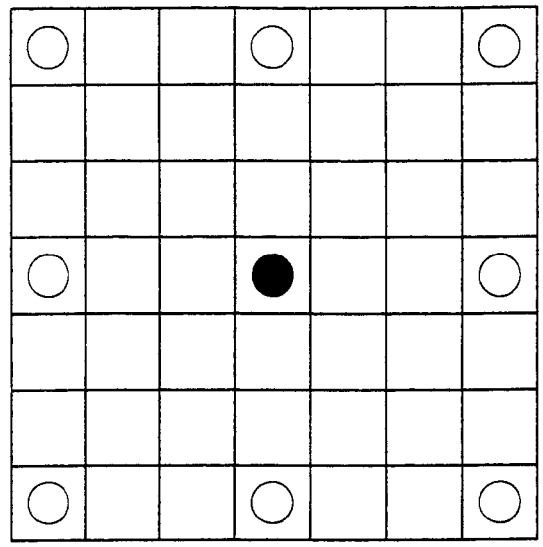
+
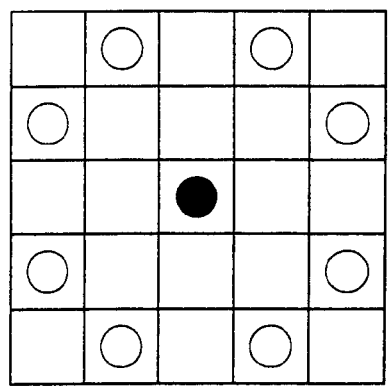
+
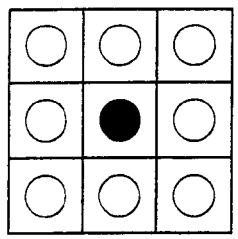
FIG.16    YH =

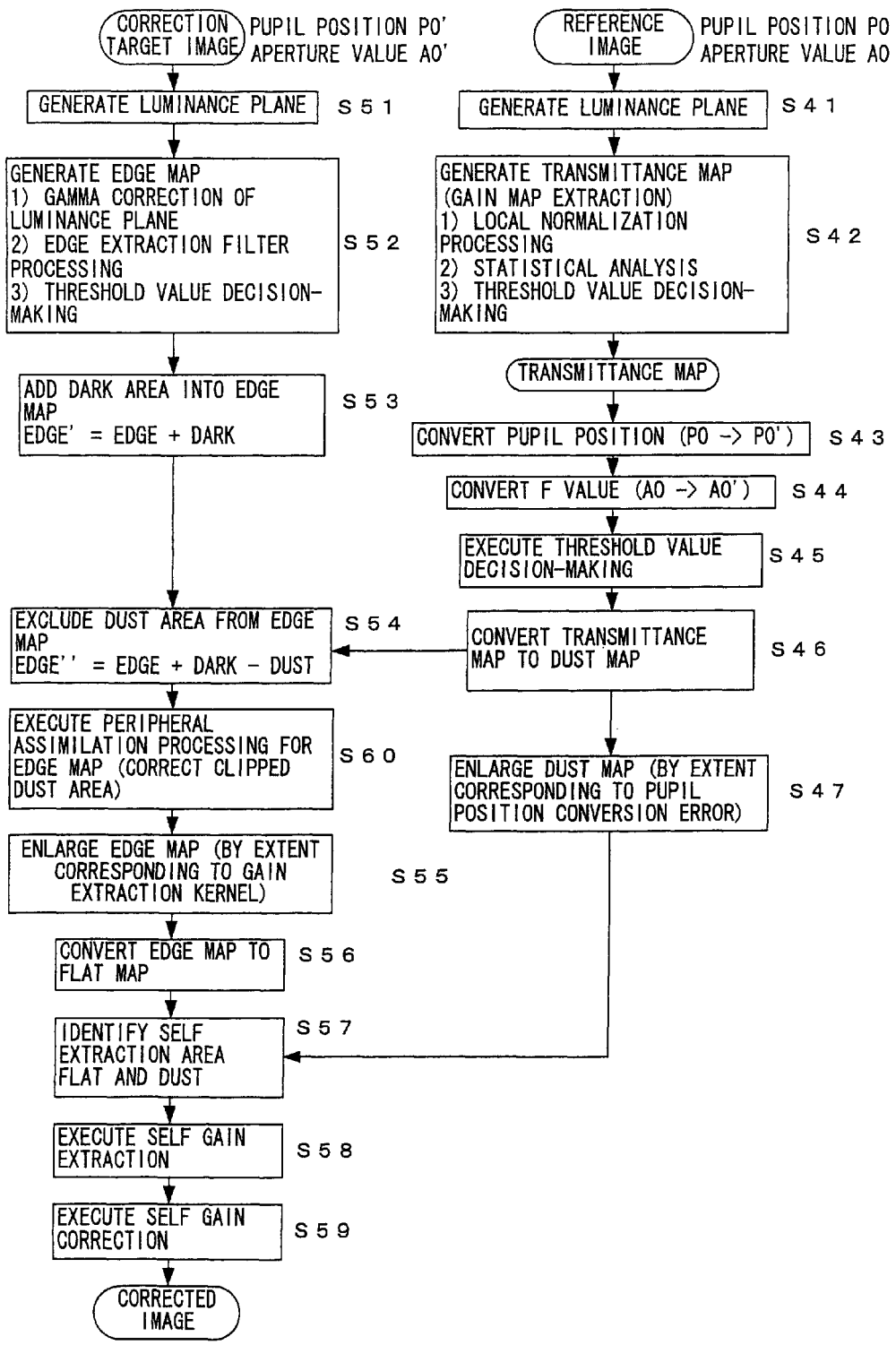

| i, j | 0 | 1 | 2 | 3 | 4 | 5 | 6 | 7 | 8 |
|---|---|---|---|---|---|---|---|---|---|
| 0 | × | ○ | ○ | ○ | ○ | ○ | ○ | ○ | ● |
| 1 | ○ | ○ | ○ | ○ | ○ | ○ | ○ | ○ | |
| 2 | ○ | ○ | ○ | ○ | ○ | ○ | ○ | ○ | |
| 3 | ○ | ○ | ○ | ○ | ○ | ○ | ○ | ○ | |
| 4 | ○ | ○ | ○ | ○ | ○ | ○ | ○ | ○ | |
| 5 | ○ | ○ | ○ | ○ | ○ | ○ | ○ | ○ | |
| 6 | ○ | ○ | ○ | ○ | ○ | ○ | ○ | ○ | |
| 7 | ○ | ○ | ○ | ○ | ○ | ○ | ○ | ○ | |
| 8 | ● | | | | | | | | ● |

IMAGE PROCESSING APPARATUS AND IMAGE PROCESSING PROGRAM

This application is a divisional application of U.S. patent application Ser. No. 12/640,603, filed Dec. 17, 2009, which in turn is a divisional application of U.S. patent application Ser. No. 10/540,972, filed Aug. 31, 2005, now U.S. Pat. No. 7,853,097, which in turn is a U.S. National Phase application of Application No. PCT/JP2003/016797, filed Dec. 25, 2003, which claims priority to Japanese Patent Application Nos. JP 2002-379719, filed Dec. 27, 2002; JP 2002-379720, filed Dec. 27, 2002; JP 2002-379721, filed Dec. 27, 2002; JP 2003-307355, filed Aug. 29, 2003; JP 2003-307356, filed Aug. 29, 2003; and JP 2003-307357, filed Aug. 29, 2003. The disclosures of the above applications are herein incorporated by reference in their entirety.

TECHNICAL FIELD

The present invention relates to an image processing apparatus that eliminates the adverse effect of dust and the like in image data obtained by photographing an image with an electronic camera or the like.

BACKGROUND ART

A technology in the related art whereby a white pattern is photographed at each aperture value and correction information is recorded in advance to be used to correct the adverse effect of dust that has entered the optical systems while manufacturing a video camera is disclosed in Japanese Laid Open Patent Publication No. H9-51459. In addition, Japanese Laid Open Patent Publication No. H10-294870 and Japanese Laid Open Patent Publication No. H11-27475 each disclose a technology for detecting dust by taking in white reference data from a uniform reflecting surface prior to the original copy read, to be adopted in copiers in which the dust conditions may change constantly. Also, U.S. Pat. No. 6,195,161 discloses a method for obtaining an attenuation signal indicating the attenuation of transmittance attributable to a film defect by obtaining transmittance data concurrently as visible light data are obtained with an infrared sensor instead of the white reference data, to be adopted in scanners.

DISCLOSURE OF THE INVENTION

However, the anti-dust measures adopted in cameras in the related art only target fixed dust having become adhered to optical components during the manufacturing process and do not deal with dust, the conditions of which may change over time depending upon the frequency of use. The problem of dust conditions that change over time appearing in photographed images tends to be more serious in single lens reflex cameras that allow the use of exchangeable lenses, which are gaining popularity today, since the optical components disposed to the front of the image sensor are uncovered.

In the area of copiers and scanners, dust data are obtained prior to or concurrently with the main scan, to be used to eliminate the adverse effect of dust that changes over time. Since a copier or a scanner, unlike a camera, includes an illuminating means that uniformly illuminates the surface of an original copy or the film surface set at a fixed distance, transmittance data can be obtained relatively easily by adding a completely uniform reflecting surface or by further providing an infrared illuminating means. However, except for during the inspection conducted in the manufacturing process, transmittance data of a completely uniform surface cannot be obtained readily with an electronic camera.

In addition, since copiers and scanners are basically fixed optical systems, it is not necessary to be concerned with changes occurring in the dust conditions due to changes in the states of the optical systems. Video cameras in the related art are not designed to handle changes in the optical conditions other than the aperture value.

The present invention provides an image processing apparatus and an image processing program, with which the adverse effect of dust or the like can be eliminated in a desirable manner from image data obtained by photographing an image with an electronic camera or the like.

According to the 1st aspect of the invention, an image processing apparatus comprises: an image obtaining unit that obtains an image captured with an image sensor; and a defect information generating unit that generates defect information indicating a defect within the image having been obtained, based upon a value at a target pixel and an average value of a plurality of pixel values corresponding to pixels present within a predetermined range containing the target pixel.

According to the 2nd aspect of the invention, in the image processing apparatus according to the 1st aspect, it is preferred that: the defect information generating unit includes a relative ratio calculation unit that calculates a relative ratio of the value at the target pixel and the average value of the plurality of pixel values corresponding to the pixels present within the predetermined range containing the target pixel, and generates the defect information based upon the calculated relative ratio.

According to the 3rd aspect of the invention, in the image processing apparatus according to the 1st or the 2nd aspect, it is preferred that: the defect information generating unit generates defect information for an area within the image, which satisfies a predetermined condition.

According to the 4th aspect of the invention, in the image processing apparatus according to any of the 1st through 3rd aspects, it is preferred that: there is further provided a correction unit that corrects the defect within the image based upon the defect information.

According to the 5th aspect of the invention, in the image processing apparatus according to the 2nd aspect, it is preferred that: there is further provided a correction unit that corrects the defect within the image based upon the defect information; and the correction unit corrects the defect by multiplying a value at a corresponding pixel by a reciprocal of the relative ratio.

According to the 6th aspect of the invention, in the image processing apparatus according to the 1st aspect, it is preferred that: the image obtaining unit obtains a plurality of images captured with the image sensor; and the defect information generating unit generates defect information indicating a defect within one of the plurality of images by using the plurality of images having been obtained.

According to the 7th aspect of the invention, in the image processing apparatus according to the 1st aspect, it is preferred that: the image obtaining unit obtains a plurality of images captured with the image sensor; and the defect information generating unit generates defect information corresponding to an entire image of each of the plurality of images by using the plurality of images having been obtained.

According to the 8th aspect of the invention, an image processing apparatus comprises: an image obtaining unit that obtains a reference image photographed through an optical system; and a defect information generating unit that generates defect information indicating a defect within the reference image having been obtained, based upon a value of a target pixel and an average value of a plurality of pixel values corresponding to pixels present within a predetermined range containing the target pixel in the reference image.

According to the 9th aspect of the invention, in the image processing apparatus according to the 8th aspect, it is preferred that: the defect information generating unit includes a relative ratio calculation unit that calculates a relative ratio of the value at the target pixel and the average value of the plurality of pixel values corresponding to the pixels present within the predetermined range containing the target pixel, and generates the defect information based upon the calculated relative ratio.

According to the 10th aspect of the invention, in the image processing apparatus according to the 8th or the 9th aspect, it is preferred that: the image obtaining unit obtains a correction target image photographed through the optical system; and there is further provided a correction unit that corrects a defect within the correction target image based upon the defect information within the reference image.

According to the 11th aspect of the invention, in the image processing apparatus according to the 10th aspect, it is preferred that: if the reference image and the correction target image have been photographed through an optical system in substantially identical optical conditions with regard to an aperture value and a pupil position, the correction unit corrects a value at a pixel constituting the correction target image by directly using the defect information having been generated.

According to the 12th aspect of the invention, in the image processing apparatus according to the 10th aspect, it is preferred that: there is further provided a defect information conversion unit that converts the defect information in correspondence to at least either of an aperture value and a pupil position constituting optical conditions of the optical system; and if the reference image and the correction target image have been photographed through the optical system under different optical conditions with regard to at least either the aperture value or the pupil position, the correction unit corrects a value at a pixel constituting the correction target image by using the converted defect information.

According to the 13th aspect of the invention, in the image processing apparatus according to the 9th aspect, it is preferred that: there is further provided a correction unit that corrects a value of a corresponding pixel in the correction target image by multiplying the value of the corresponding pixel with a reciprocal of the relative ratio calculated for the reference image.

According to the 14th aspect of the invention, in the image processing apparatus according to the 2nd or the 9th aspect, it is preferred that: the relative ratio calculation unit sets the calculated relative ratio to 1 if the calculated relative ratio falls within a predetermined range containing 1.

According to the 15th aspect of the invention, in the image processing apparatus according to the 14th aspect, it is preferred that: the relative ratio calculation unit correlates the predetermined range over which the calculated relative ratio is set to 1 with a standard deviation value of the calculated relative ratio.

According to the 16th aspect of the invention, in the image processing apparatus according to the 1st or the 8th aspect, it is preferred that: the predetermined range containing the target pixel is greater than a defect area manifesting within the image or the reference image.

According to the 17th aspect of the invention, in the image processing apparatus according to the 10th aspect, it is preferred that: the image obtaining unit obtains a reference image photographed within a predetermined period of time preceding or following a time point at which the correction target image is photographed.

According to the 18th aspect of the invention, in the image processing apparatus according to the 17th aspect, it is preferred that: the image obtaining unit obtains a reference image photographed at a time point closest to or second closest to a time point at which the correction target image is photographed.

According to the 19th aspect of the invention, an image processing apparatus comprises: an image obtaining unit that obtains an image captured by using an image sensor capable of separating light into a plurality of colors; a luminance signal generating unit that generates a luminance signal based upon signals of the plurality of colors constituting the image; and a defect information generating unit that generates defect information indicating a defect within the image based upon the luminance signal for the image having been generated.

According to the 20th aspect of the invention, in the image processing apparatus according to the 19th aspect, it is preferred that: there is further provided a correction unit that corrects a value corresponding to a color component at a defective pixel within the image by using the defect information.

According to the 21st aspect of the invention, in the image processing apparatus according to the 19th aspect, it is preferred that: there is further provided a defect information generating unit that generates defect information indicating a defect within the image having been obtained based upon a value indicated by the luminance signal generated for a target pixel and an average value among values indicated by luminance signals generated for a plurality of pixels within a predetermined range containing the target pixel.

According to the 22nd aspect of the invention, in the image processing apparatus according to the 21st aspect, it is preferred that: the defect information generating unit includes a relative ratio calculation unit that calculates a relative ratio of the value indicated by the luminance signal generated for the target pixel and the average value of the luminance signals generated for the plurality of pixels within the predetermined range containing the target pixel, and generates the defect information based upon the relative ratio having been calculated.

According to the 23rd aspect of the invention, in the image processing apparatus according to the 21st aspect, it is preferred that: there is further provided a correction unit that corrects a value corresponding to a color component at a corresponding pixel by multiplying the value by a reciprocal of the relative ratio.

According to the 24th aspect of the invention, in the image processing apparatus according to the 19th aspect, it is preferred that: the image obtaining unit obtains a plurality of images captured with the image sensor; the luminance signal generating unit generates the luminance signals for the plurality of images having been obtained; and the defect information generating unit generates defect information indicating a defect within an image among the plurality of images by using the luminance signals generated for the plurality of images.

According to the 25th aspect of the invention, in the image processing apparatus according to the 19th aspect, it is preferred that: the image obtaining unit obtains a plurality of images captured with the image sensor; the luminance signal generating unit generates luminance signals for the plurality of images having been obtained; and the defect information generating unit generates defect information corresponding to an entire image of each of the plurality of images by using the plurality of images having been obtained.

According to the 26th aspect of the invention, in the image processing apparatus according to the 1st aspect, it is preferred that: the image sensor captures an image through an optical system; and the defect information is information on a projected image of a defect within an optical path, which manifests in the image.

According to the 27th aspect of the invention, in the image processing apparatus according to the 26th aspect, it is preferred that: the defect information generating unit simultaneously generates information indicating a position of the projected image of the defect within the optical path and information indicating intensity of the projected image of the defect within the optical path and records the position information and the intensity information.

According to the 28th aspect of the invention, in the image processing apparatus according to the 27th aspect, it is preferred that: the defect information generating unit moves the predetermined range over which the average value is calculated for each target pixel and generates continuous sets of information related to the intensity of the projected image of the defect within the optical path.

According to the 29th aspect of the invention, in the image processing apparatus according to the 4th aspect, it is preferred that: the correction unit determines a correction value by using an initial signal value indicated at a correction target pixel position.

According to the 30th aspect of the invention, in the image processing apparatus according to the 8th aspect, it is preferred that: the defect information is information on a projected image of a defect within an optical path, which manifests in the image.

According to the 31st aspect of the invention, in the image processing apparatus according to the 30th aspect, it is preferred that: the defect information generating unit simultaneously generates information indicating a position of the projected image of the defect within the optical path and information indicating intensity of the projected image of the defect within the optical path and records the position information and the intensity information.

According to the 32nd aspect of the invention, in the image processing apparatus according to the 31st aspect, it is preferred that: the defect information generating unit moves the predetermined range over which the average value is calculated for each target pixel and generates continuous sets of information related to the intensity of the projected image of the defect within the optical path.

According to the 33rd aspect of the invention, in the image processing apparatus according to the 10th aspect, it is preferred that: the correction unit determines a correction value by using an initial signal value indicated at a specific correction target pixel position.

According to the 34th aspect of the invention, in the image processing apparatus according to the 15th aspect, it is preferred that: the relative ratio calculation unit sets the predetermined range over which the calculated relative ratio is set to 1 to a±(3× standard deviation value) range.

According to the 35th aspect of the invention, in the image processing apparatus according to the 26th aspect, it is preferred that: the predetermined range containing the target pixel is greater than a range over which the projected image of the defect within the optical path spreads inside the image.

According to the 36th aspect of the invention, in the image processing apparatus according to the 30th aspect, it is preferred that: the predetermined range containing the target pixel is greater than a range over which the projected image of the defect within the optical path spreads inside the reference image.

According to the 37th aspect of the invention, an image processing apparatus comprises: an image obtaining unit that obtains a first image photographed through an optical system and a second image photographed under optical conditions different from optical conditions in which the first image is photographed; and a defect information generating unit that generates defect information indicating a defect in the first image or the second image by using the first image and the second image.

According to the 38th aspect of the invention, in the image processing apparatus according to the 37th aspect, it is preferred that: there is further provided a correction unit that corrects a defect in the first image or the second image by using the defect information.

According to the 39th aspect of the invention, in the image processing apparatus according to the 37th aspect, it is preferred that: the first image and the second image are photographed under different optical conditions with regard to at least either of an aperture value and a pupil position.

According to the 40th aspect of the invention, in the image processing apparatus according to any of the 37th through 39th aspects, it is preferred that: the defect information generating unit includes an optical condition conversion unit that converts at least either the first image or the second image so as to conform to a specific optical condition, in order to eliminate a mismatch of the optical conditions for the first image and the second image.

According to the 41st aspect of the invention, in the image processing apparatus according to the 40th aspect, it is preferred that: if the optical conditions with regard to the aperture value are different, the optical condition conversion unit executes low pass filter processing on a pixel signal generated based upon the first image or the second image so as to convert a defect state corresponding to the first image or the second image to a defect state estimated to manifest at a matching aperture value.

According to the 42nd aspect of the invention, in the image processing apparatus according to the 41th aspect, it is preferred that: the optical condition conversion unit executes conversion by using a substantially uniformly weighted low pass filter.

According to the 43rd aspect of the invention, in the image processing apparatus according to the 40th aspect, it is preferred that: if the optical conditions with regard to the pupil position are different, the optical condition conversion unit executes displacement processing through which a pixel signal generated based upon the first image or the second image is displaced from a center of an optical axis of the optical system along a direction of a radius vector so as to covert a defect state corresponding to the first image or the second image to a defect state estimated to manifest at a matching pupil position.

According to the 44th aspect of the invention, in the image processing apparatus according to the 43th aspect, it is preferred that: the optical condition conversion unit executes displacement processing through which a pixel signal located further away from the center of the optical axis is shifted to a greater extent along the radius vector.

According to the 45th aspect of the invention, in the image processing apparatus according to the 43rd or the 44th aspect, it is preferred that: the optical condition conversion unit executes the displacement processing by executing an arithmetic operation to predict an extent of displacement on an assumption that foreign matter causing the defect is present over a specific distance from an image-capturing surface within the optical system along the optical axis.

According to the 46th aspect of the invention, in the image processing apparatus according to the 37th aspect, it is preferred that: one of the first image and the second image is a correction target image to undergo correction and the other image is a reference image used to generate the defect information.

According to the 47th aspect of the invention, in the image processing apparatus according to the 37th aspect, it is preferred that: the first image and the second image are both correction target images to undergo correction; and the defect information generating unit generates defect information to be used commonly in conjunction with the first image and the second image by using the first image and the second image.

According to the 48th aspect of the invention, in the image processing apparatus according to the 47th aspect, it is preferred that: the defect information generating unit includes an optical condition conversion unit that converts at least either the first image or the second image so as to conform to a specific optical condition, in order to eliminate a mismatch of the optical conditions for the first image and the second image.

According to the 49th aspect of the invention, in the image processing apparatus according to the 46th aspect, it is preferred that: the image obtaining unit obtains the reference image photographed at an aperture value corresponding to a narrowest aperture opening setting in an adjustable aperture value range of the optical system.

According to the 50th aspect of the invention, in the image processing apparatus according to the 37th aspect, it is preferred that: the defect information generating unit generates defect information indicating a defect within the image having been obtained, based upon a value of a target pixel and an average value of a plurality of pixel values corresponding to pixels present within a predetermined range containing the target pixel in the image.

According to the 51st aspect of the invention, in the image processing apparatus according to the 46th or the 49th aspect, it is preferred that: the image obtaining unit obtains a reference image photographed within a predetermined period of time preceding or following a time point at which the correction target image is photographed.

According to the 52nd aspect of the invention, an image processing apparatus comprises: an image obtaining unit that obtains a first image photographed through an optical system and a second image photographed under optical conditions different from optical conditions in which the first image is photographed; and a correction unit that corrects a defect contained within the first image or the second image by using the first image and the second image.

According to the 53rd aspect of the invention, in the image processing apparatus according to the 52th aspect, it is preferred that: the first image and the second image are photographed under different optical conditions with regard to at least either of an aperture value and a pupil position.

According to the 54th aspect of the invention, an image processing apparatus comprises: an image obtaining unit that obtains a photographic image captured with an image sensor; a flat portion extraction unit that extracts a flat portion area within the photographic image having been obtained; and a defect information generating unit that generates defect information corresponding to the extracted flat portion area.

According to the 55th aspect of the invention, in the image processing apparatus according to the 54th aspect, it is preferred that: there is further provided a correction unit that corrects an image within the flat portion area based upon the defect information.

According to the 56th aspect of the invention, in the image processing apparatus according to the 54th or the 55th aspect, it is preferred that: the defect information corresponding to the flat portion area is generated based upon a value at a target pixel and an average value of a plurality of pixel values corresponding to pixels present within a predetermined range containing the target pixel in the image within the flat portion area.

According to the 57th aspect of the invention, in the image processing apparatus according to the 56th aspect, it is preferred that: the defect information generating unit includes a relative ratio calculation unit that calculates a relative ratio of the value at the target pixel and the average value of the plurality of pixel values corresponding to the pixels present within the predetermined range containing the target pixel, and generates the defect information corresponding to the flat portion area based upon the calculated relative ratio.

According to the 58th aspect of the invention, in the image processing apparatus according to the 55th aspect, it is preferred that: there is further provided a relative ratio calculation unit that calculates a relative ratio of a value at a target pixel and an average value of pixel values corresponding to a plurality of pixels present within a predetermined range containing the target pixel, among pixels constituting an image of the flat portion area; the defect information generating unit generates the defect information corresponding to the flat portion area based upon the relative ratio having been calculated; and the correction unit uses a reciprocal of the relative ratio corresponding to a pixel in the image of the flat portion area when correcting a value of the corresponding pixel in the image of the flat portion area by multiplying the pixel value by the reciprocal.

According to the 59th aspect of the invention, in the image processing apparatus according to the 58th aspect, it is preferred that: the correction unit executes low pass processing on the relative ratio which has been generated as the defect information and corrects the value of the corresponding pixel in the image of the flat portion area by multiplying the pixel value by a reciprocal of the relative ratio having undergone the low pass processing, which corresponds to the pixel in the image of the flat portion area.

According to the 60th aspect of the invention, in the image processing apparatus according to any of the 54th through 59th aspects, it is preferred that: the flat portion extraction unit executes edge extraction within the photographic image and extracts an area in which no edge is extracted as a flat portion area.

According to the 61st aspect of the invention, in the image processing apparatus according to the 54th aspect, it is preferred that: the flat portion extraction unit includes a gradation conversion unit that executes gradation conversion on the photographic image and executes a flat portion area extraction on the photographic image having undergone the gradation conversion.

According to the 62nd aspect of the invention, in the image processing apparatus according to the 61st aspect, it is preferred that: when gradation of the photographic image is indicated with a linear signal, the gradation conversion unit converts the linear signal to a nonlinear signal.

According to the 63rd aspect of the invention, in the image processing apparatus according to the 62nd aspect, it is preferred that: the gradation conversion unit executes conversion by enlarging the gradation on a low intensity side and compressing the gradation on a high intensity side.

According to the 64th aspect of the invention, in the image processing apparatus according to the 62nd or the 63rd aspect, it is preferred that: the gradation conversion unit executes conversion by using a power function.

According to the 65th aspect of the invention, in the image processing apparatus according to the 64th aspect, it is preferred that: the power function is a square root function.

According to the 66th aspect of the invention, in the image processing apparatus according to any of the 60th through 65th aspects, it is preferred that: the edge extraction is executed by calculating differences corresponding to a plurality of distances between a target pixel and surrounding pixels along a plurality of directions.

According to the 67th aspect of the invention, in the image processing apparatus according to any of the 55, 58 and 59th aspect, it is preferred that: there is further provided a luminance level decision-making unit that makes a decision as to whether or not a luminance level of the photographic image is equal to or higher than a predetermined luminance level; and the correction unit executes correction for an area determined to be a flat portion area, where the luminance level is equal to or greater than the predetermined level.

According to the 68th aspect of the invention, in the image processing apparatus according to the 54th aspect, it is preferred that: there is further provided a reference image obtaining unit that obtains a reference image captured with the image sensor and a reference image defect information generating unit that generates defect information corresponding to the reference image; and the defect information generating unit generates the defect information corresponding to the flat portion area by using area information included in the defect information for the reference image and area information corresponding to the flat portion area in combination.

According to the 69th aspect of the invention, in the image processing apparatus according to the 68th aspect, it is preferred that: if an area that is not extracted as the flat portion area is still indicated to be a defect area by the defect information for the reference image, the flat portion extraction unit extracts the defect area as a flat portion area.

According to the 70th aspect of the invention, in the image processing apparatus according to the 68th or the 69th aspect, it is preferred that: the defect information generating unit generates the defect information for an area indicated as a defect area by the defect information for the reference image and also determined to be the flat portion area.

According to the 71st aspect of the invention, in the image processing apparatus according to the 68th aspect, it is preferred that: there is further provided a defect information conversion unit that converts the defect information for the reference image to defect information equivalent to defect information for a reference image photographed under optical conditions identical to optical conditions under which the photographic image has been photographed when the photographic image and the reference image have been photographed under different optical conditions; and the correction unit executes correction by using the defect information for the reference image resulting from the conversion.

According to the 72nd aspect of the invention, in the image processing apparatus according to the 69th or the 70th aspect, it is preferred that: there is further provided a defect information conversion unit that converts the defect information for the reference image to defect information equivalent to defect information for a reference image photographed under optical conditions identical to optical conditions under which the photographic image has been photographed when the photographic image and the reference image have been photographed under different optical conditions; and the flat portion extraction unit and the correction unit use the defect information for the reference image resulting from the conversion.

According to the 73rd aspect of the invention, in the image processing apparatus according to the 71st or the 72nd aspect, it is preferred that: in consideration of an error in defect information conversion executed by the defect information conversion unit, the correction unit expands the defect area indicated by the defect information for the reference image, at least by an extent corresponding to the error in the defect information conversion.

According to the 74th aspect of the invention, in the image processing apparatus according to the 54th aspect, it is preferred that: the image obtaining unit obtains a plurality of photographic images captured with the image sensor; the flat portion extraction unit extracts the flat portion area in each of the plurality of photographic images; and the defect information generating unit generates defect information corresponding to the flat portion area in one of the plurality of images by using images of flat portion areas in the plurality of images having been extracted.

According to the 75th aspect of the invention, in the image processing apparatus according to the 54th aspect, it is preferred that: the image obtaining unit obtains a plurality of photographic images captured with the image sensor; the flat portion extraction unit extracts the flat portion area in each of the plurality of photographic images; and the defect information generating unit generates defect information corresponding to an entire image of each of the plurality of images by using images of flat portion areas in the plurality of images having been extracted.

According to the 76th aspect of the invention, in the image processing apparatus according to the 74th or the 75th aspect, it is preferred that: the defect information corresponding to the flat portion area is generated based upon a value at a target pixel and an average value of a plurality of pixel values corresponding to pixels present within a predetermined range containing the target pixel in the image within the flat portion area.

According to the 77th aspect of the invention, in the image processing apparatus according to the 76th aspect, it is preferred that: the defect information generating unit includes a relative ratio calculation unit that calculates a relative ratio of the value at the target pixel and the average value of the plurality of pixel values corresponding to the pixels present within the predetermined range containing the target pixel, and generates the defect information corresponding to the flat portion area based upon the calculated relative ratio.

According to the 78th aspect of the invention, in the image processing apparatus according to the 69th aspect, it is preferred that: if there are a predetermined number of pixels or more pixels from which an edge has been extracted are present around the defect area indicated by the defect information for the reference image, the flat portion extraction unit does not extract the defect area as the flat portion area.

According to the 79th aspect of the invention, in the image processing apparatus according to the 78th aspect, it is preferred that: if an edge has been extracted from a majority of pixels among pixels present in a predetermined area surrounding a pixel in the defective area, the flat portion extraction unit does not extract the pixel in the defect area as a pixel in the flat portion.

According to the 80th aspect of the invention, a computer-readable computer program product has an image processing program enabling a computer to execute functions of the image processing apparatus according to any of the 1st through 79th aspects.

BRIEF DESCRIPTION OF THE DRAWINGS

FIG. 8 shows how the positions of a dust shadow may change as the pupil position changes;

FIG. 9 shows how the size of a dust shadow may change as the F value, i.e., the aperture value, changes;

FIG. 10 shows one-dimensional filter coefficients each corresponding to a given aperture value;

FIG. 11 shows a filter used in transmittance map conversion with the aperture value set to F16, expressed as a two-dimensional filter;

FIG. 16 shows an edge extraction filter;

FIG. 17 presents a flowchart of the processing executed by the PC in a fourth embodiment;

FIG. 18 shows how the program may be provided in a recording medium such as a CD-ROM or through a data signal on the Internet or the like; and FIG. 19 illustrates the edge map peripheral assimilation processing.

BEST MODE FOR CARRYING OUT THE INVENTION

First Embodiment (Structures of Electronic Camera and Personal Computer)

Figure 1:
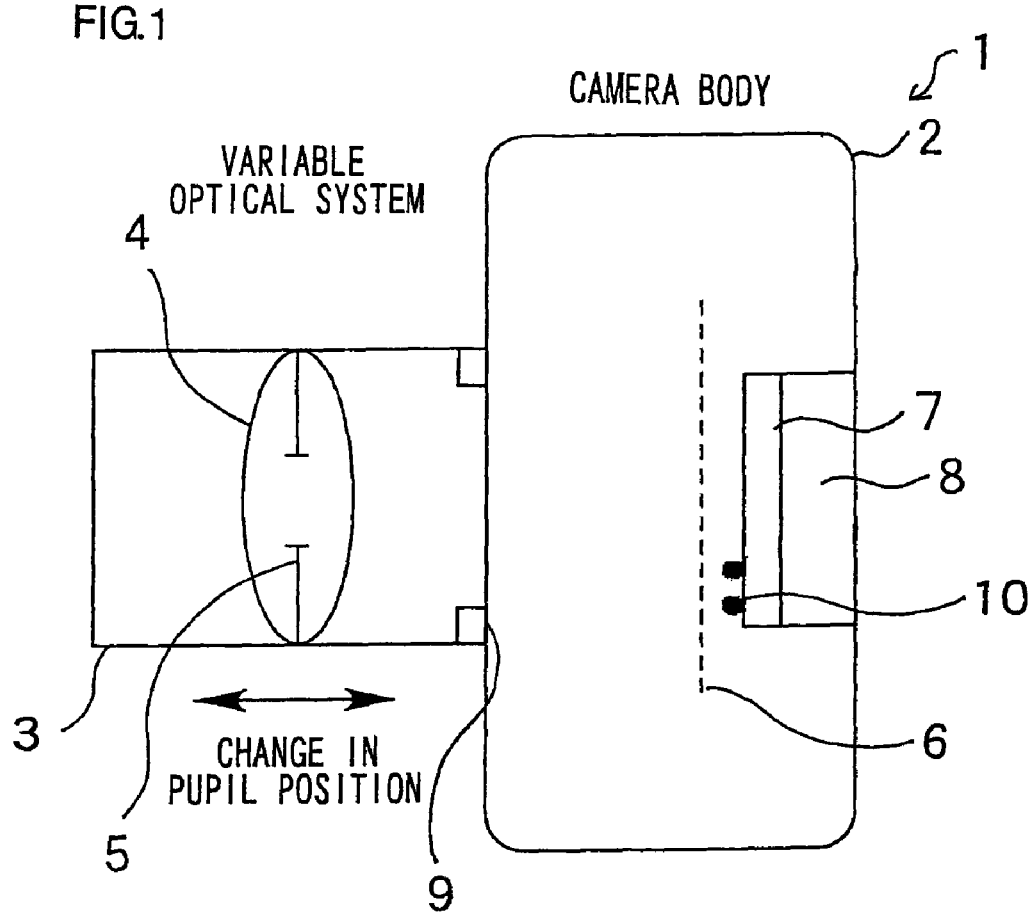
FIG. 1 shows the structure of an electronic camera that allows the use of exchangeable lenses.

FIG. 1 shows the structure of a single lens reflex electronic still camera (hereafter referred to as an electronic camera) that allows the use of exchangeable lenses. The electronic camera 1 includes a camera body 2 and a variable optical system 3 constituted with a mount-type exchangeable lens. The variable optical system 3 includes a built-in lens 4 and a built-in aperture 5. While the lens 4 is constituted with a set of a plurality of optical lenses, a single representative lens is shown in the figure, and the position of the lens 4 is referred to as a main pupil position (hereafter simply referred to as a pupil position). The variable optical system 3 may be a zoom lens. The pupil position is indicated with a value determined in correspondence to the lens type or the zoom position of the zoom lens. It may be affected by the focal length, as well.

The camera body 2 includes a shutter 6, optical components 7 such as an optical filter and a cover glass, and an image sensor (image-capturing element) 8. The variable optical system 3 can be attached/detached freely at a mount unit 9 of the camera body 2. In addition, the variable optical system 3 transmits optical parameters such as information related to the pupil position and information related to the aperture value to a control unit 17 (see FIG. 2) of the electronic camera 1 via the mount unit 9. The aperture value may change within a range of, for instance, F2.8 to F22.

Reference numeral 10 indicates dust having become adhered to the surface of an optical components 7 disposed to the front of the image sensor 8. The following two facts have been learned based upon the results of tests conducted by varying the aperture value and the pupil position at the variable optical system 3 to evaluate changes occurring with respect to the dust shadows in the photographic image.

(1) The size of a dust shadow and the light transmittance change in correspondence to the aperture value.

(2) The position of the dust is shifted as the lens pupil position changes.

These two facts having been learned through the tests indicate that dust settled at a fixed position is photographed differently each time the photographing conditions (aperture value and pupil position) set for the lens change. A method that may be adopted to eliminate the adverse effect of dust in such a variable optical system is explained below.

Figure 2:
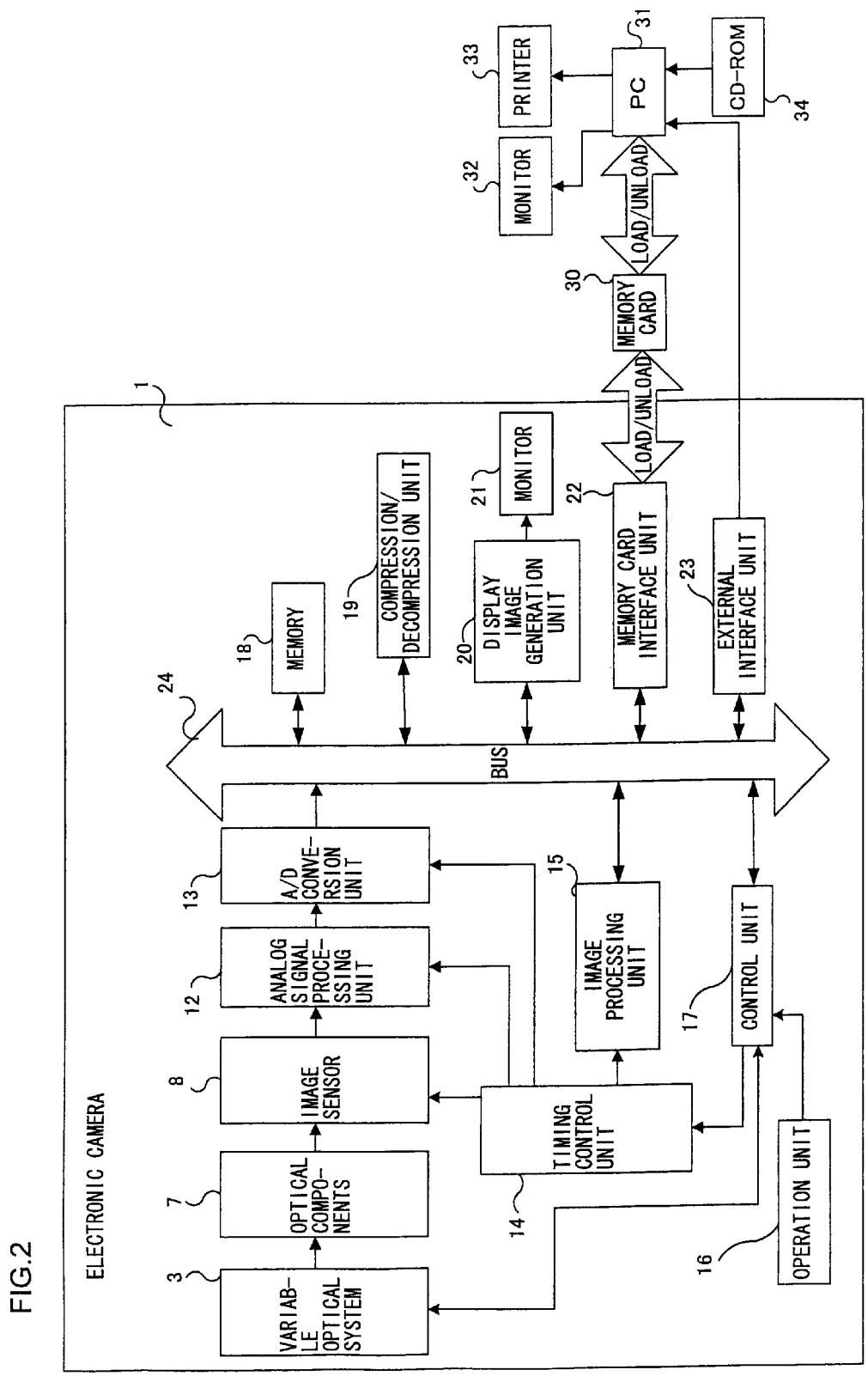
FIG. 2 shows a block diagram of the electronic camera used in conjunction with a personal computer (PC) and peripheral apparatuses.

FIG. 2 shows a block diagram of the electronic camera 1 used in conjunction with a PC (personal computer) 31 and peripheral apparatuses. The PC 31, which functions as an image processing apparatus, executes dust effect elimination processing to be detailed later by obtaining image data from the electronic camera 1.

The electronic camera 1 comprises the variable optical system 3, the optical components 7, the shutter 6 (not shown in FIG. 2), the image sensor 8, an analog signal processing unit 12, an A/D conversion unit 13, a timing control unit 14, an image processing unit 15, an operation unit 16, the control unit 17, a memory 18, a compression/decompression unit 19, a display image generating unit 20, a monitor 21, a memory card interface unit 22 and an external interface unit 23.

The image sensor 8 captures a subject image through the variable optical system 3 and outputs image signals (image capturing signals) corresponding to the captured subject image. The image sensor 8 includes a rectangular image capturing area constituted with a plurality of pixels and sequentially outputs analog image signals each corresponding to the electric charge having been stored at a specific pixel to the analog signal processing unit 12 in units of individual pixels. The image sensor 8 may be constituted with, for instance, a single plate-type color CCD. The analog signal processing unit 12 includes an internal CDS (correlational double sampling) circuit, an internal AGC (of automatic-gain control) circuit and the like, and executes a specific type of analog processing on the image signals input thereto. The A/D conversion unit 13 converts the analog signals having been processed at the analog signal processing unit 12 to digital signals. The timing control unit 14, which is controlled by the control unit 17, controls the timing with which the image sensor 8, the analog signal processing unit 12, the A/D conversion unit 13 and the image processing unit 15 are individually engaged in operation.

The memory card interface unit 22 achieves interface with a memory card (a card-type removable memory) 30. The external interface unit 23 achieves interface with an external apparatus such as the PC 31 via a specific type of cable or a wireless transmission path. The operation unit 16 is equivalent to a shutter release button, a mode selector button and the like. At the monitor 21, various menus, a subject image captured with the image sensor 8 or an image reproduced based upon image data stored in the memory card is displayed. The output of the operation unit 16 is connected to the control unit 17, whereas the output of the display image generating unit 20 is connected to the monitor 21. The image processing unit 15 may be constituted with, for instance, a single-chip microprocessor dedicated to image processing.

The A/D conversion unit 13, the image processing unit 15, the control unit 17, the memory 18, the compression/decompression unit 19, the display image generating unit 20, the memory card interface unit 22 and the external interface unit 23 are connected with one another via a bus 24.

At the PC 31 to which a monitor 32, a printer 33 and the like are connected, an application program recorded in a CD-ROM 34 is preinstalled. In addition, the PC 31 includes a memory card interface unit (not shown) for achieving interface with the memory card 30 and an external interface unit (not shown) for achieving interface with an external apparatus such as the electronic camera 1 via a specific type of cable or a wireless transmission path as well as a CPU, a memory and a hard disk (not shown).

As the operator of the electronic camera 1 structured as shown in FIG. 1 selects a photographing mode and presses the shutter release button via the operation unit 16, the control unit 17 implements timing control on the image sensor 8, the analog signal processing unit 12 and the A/D conversion unit 13 via the timing control unit 14. The image sensor 8 generates image signals corresponding to an optical image formed at the image capturing area by the variable optical system 3. The image signals then undergo a specific type of analog signal processing at the analog signal processing unit 12 and are output to the A/D conversion unit 13 as image signals having undergone the analog processing. The A/D conversion unit 13 digitizes the analog image signals and provides the resulting image data to the image processing unit 15.

It is assumed that the image sensor 8 in the electronic camera 1 achieved in the embodiment is a typical single-plate color image sensor having R (red), G (green) and B (blue) color filters disposed in a Bayer array and that the image data provided to the image processing unit 15 are expressed in the RGB colorimetric system. At each of the pixels constituting the image data, color information corresponding to a single color component among R, G and B is present. In this document, the term "pixel" referring to each of the photoelectric conversion elements constituting the image sensor 8 is also used to refer to a single unit of image data corresponding to the pixel. In addition, the description is given by adopting a concept that an image, too, is constituted with the plurality of pixels.

The image processing unit 15 executes image processing such as interpolation, gradation conversion and edge emphasis on such image data. The image data having undergone the image processing then undergo a specific type of compression processing at the compression/decompression unit 19 as required and then are recorded into the memory card 30 via the memory card interface unit 22. The image data having undergone the image processing may instead be directly recorded into the memory card 30 without having any compression processing executed on them.

The image data having undergone the image processing are provided to the PC 31 via the memory card 30. They may be provided to the PC 31 via the external interface 23 and a specific type of cable or wireless transmission path, instead. It is assumed that following the image processing, the image data will have undergone the interpolation processing, with color information corresponding to all the color components, R, G and B present at each pixel.

(Dust Effect Elimination Processing)

Next, an explanation is given on the processing executed on each set of photographic image data to eliminate the adverse effect of dust. In the first embodiment, a reference image used to obtain dust information corresponding to each optical photographing condition is photographed with the electronic cameral. However, the reference image is not constituted with completely uniform white reference data but is obtained by photographing, for instance, blue sky, a substantially uniform wall surface, a gray chart or a solid paper surface. The reference data used in the embodiment may contain limb darkening at the lens (vignetting), subject gradation, shading at the image sensor and the like. It is assumed that readily available reference data that can be obtained with ease through a photographing operation performed at a convenient location are used, and the reference data do not need to be perfectly uniform, since uniformity is achieved through conversion executed by using an algorithm in the image processing.

(Operation Executed on Electronic Camera Side)

Figure 3:
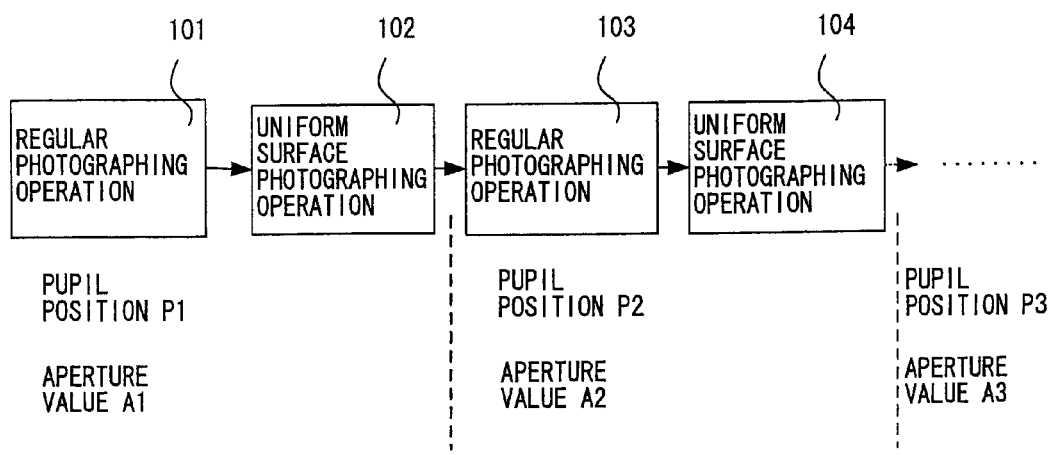
FIG. 3 shows the photographing procedure executed on the electronic camera side in a first embodiment.

FIG. 3 shows the photographing procedure executed at the electronic camera 1 in the first embodiment.

1) A regular photographing operation 101 is executed at a pupil position P1 and an aperture value A1 and correction target image data 1 are output.

2) A uniform surface photographing operation 102 is then executed at the same pupil position P1 and aperture value A1 and reference image data 1 are output.

3) Next, a regular photographing operation 103 is executed by varying the pupil position and the aperture value to P2 and A2 respectively, and correction target image data 2 are output.

4) A uniform surface photographing operation 104 is then executed at the same pupil position P2 and aperture value A2 as those set for the regular photographing operation 103, and reference image data 2 are output.

Namely, a photographing operation is first performed by holding the electronic camera 1 toward the subject to be photographed (regular photographing operation), and immediately afterward, the electronic camera 1 is held toward the sky or a wall surface to photograph a uniform surface (uniform surface photographing operation). Alternatively, the state of the camera may be sustained unchanged from that during the regular photographing operation and a sheet of white paper or a solid color paper may be held at a position several centimeters to 10 cm in front of the lens. Thus, a pair of photographing operations, i.e., a regular photographing operation and a uniform surface photographing operation, are performed. The description "image data are output" in this context refers to recording of the image data into the memory card 30 or a direct output of the image data to the PC 31 via the external interface 23.

Since there is a likelihood of the state of dust changing in the electronic camera, the uniform surface is photographed immediately after photographing the correction target image under the same optical conditions in the embodiment. However, the uniform surface actually does not need to be photographed immediately after the regular photographing operation. As long as the same photographing conditions can be optically replicated with regard to the pupil position and the aperture value, even uniform surface data obtained through a photographing operation performed even a day or so later are often good enough for use since the state of most dust is unlikely to have changed greatly. Accordingly, the data obtained by replicating the same optical conditions and performing a photographing operation with a time lag small enough to sufficiently reflect the dust information corresponding to the regular photographing operation may be used as the uniform surface data. It is to be noted that the order in which the regular photographing operation and the uniform surface photographing operation are performed may be reversed by first executing the uniform surface photographing operation and then performing the regular photographing operation.

(Operation Executed on Image Processing Apparatus Side)

Figure 6:
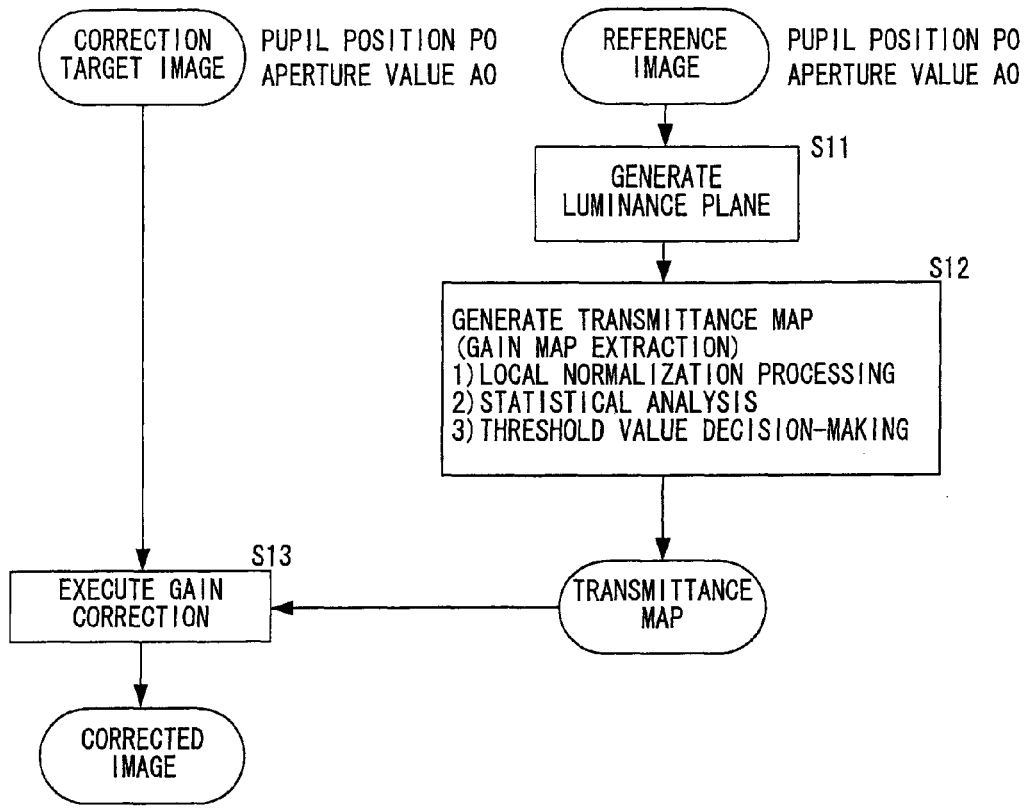
FIG. 6 presents a flowchart of the processing executed by the PC in the first embodiment.

Image data obtained through a photographing operation executed at the electronic camera 1 first undergo the specific image processing and then are provided to the PC 31. At the PC 31, dust effect elimination processing is executed by using a pair of sets of data, i.e., a set of correction target image data and a set of reference image data. The PC 31 may be regarded as an image processing apparatus that executes the dust effect elimination processing. Both the reference image data and the correction target image data are input to the PC 31 after undergoing Bayer array RGB interpolation processing. The reference image data and the correction target image data explained below are obtained through photographing operations performed under identical optical conditions, i.e., at the same pupil position and the same aperture value. FIG. 6 presents a flowchart of the processing executed at the PC 31.

(Processing on Reference Image Data)
1) Generation of Luminance Plane

In step S11 in FIG. 6, a luminance (or brightness) plane is generated. A luminance signal is generated based upon the R, G and B signals by using the following expression (1) for each pixel [i,j] constituting the reference image data. [i,j] indicates the position of the specific pixel.

$$Y[i,j] = (R[i,j] + 2*G[i,j] + B[i,j])/4 \quad (1)$$

While the R, G and B planes may be individually analyzed, the adverse effect of dust shadows basically manifests simply as signal attenuation, regardless of the color component. Accordingly, the R, G and B signals are converted to a luminance component that enables effective use of all the available information and can be used to reduce the adverse effect of random noise. In addition, since only the single luminance component plane instead of the three planes, i.e., the R, G and B planes, needs to be analyzed, the processing can be speeded up. The luminance component generation ratios are not limited to those in the expression above and they may be set to R:G:B=0.3:0.6:0.1 instead.

2) Generation of Transmittance Map (Gain Map Extraction)

In step S12, a transmittance map is generated (gain map extraction) by executing the following processing.

2-1) Local Normalization Processing (Gain Extraction Processing)

As described earlier, the reference image data do not necessarily achieve perfect uniformity. For this reason, the luminance plane having been generated does not achieve perfect uniformity, either. A transmittance signal T[i,j] is calculated as expressed in (2) below for each of the pixels in such a luminance plane by locally normalizing (standardizing) the pixel value. Namely, the relative ratio of the value indicated for the target pixel [i,j] and the average pixel value taken over a local range containing the pixel is calculated for each pixel. Through this processing, any non-uniformity such as gradation and shading contained in the uniform surface data is algorithmically eliminated in a desirable manner and, as a result, the extent to which the transmittance has been lowered due to a dust shadow alone can be extracted. The transmittance values over the entire image plane determined as described above are referred to as a transmittance map (gain map). The transmittance map contains defect information indicating defects in the reference image. It is to be noted that a pixel value is a value indicated by a color signal (color information) corresponding to a specific color component or a luminance signal (luminance information) generated at each pixel. For instance, when the data are expressed with one byte, a pixel value assumes a value within a range of 0 to 255.

$$T[i,j] = \frac{Y[i,j]}{\left(\sum_{m=i-a}^{i+a} \sum_{n=j-b}^{j+b} Y[i+m, j+n]\right) / (2a+1)(2b+1)} \quad (2)$$

The local average should be calculated over a range of (2a+1)×(2b+1) pixels, which ranges over an area greater than the size of the dust. Ideally, the local average should be calculated over a range having an area approximately 3 times the area of the dust shadow to obtain accurate transmittance data. "a" represents the number of pixels disposed to the left and to the right relative to the target pixel [i,j] and b represents the number of pixels disposed further upward and downward relative to the target pixel [i,j]. For instance, assuming that the pixels are disposed with a 12 μm pitch at the image sensor 8 and that the distance between the image-capturing surface and the surface having the dust adhered thereto is 1.5 mm, the diameter of large size dust is equivalent to approximately 15 pixels when photographed with the aperture value set to F22 and the diameter of the large dust equivalent to approximately 40 pixels with the aperture value set to F4. Accordingly, it is desirable to set both a and b to 40 so as to take the local average over an 81×81 pixel range. However, it is simply an example, and the local average may be calculated over a pixel range containing a number of pixels other than 81×81.

The extent to which dust shadows manifest is greatly dependent upon the aperture value, and the shadow of a very small dust mote disappears as soon as the aperture is opened. However, the shadow of a large dust mote may still occupy a large area although the shadow itself is lightened even when the aperture is set to the open side. Depending upon the pixel pitch width at the image sensor, a round dust shadow ranging over several tens of pixels may manifest even when the aperture is set to the open side. In such a case, it is necessary to calculate the local average over a very large range. For this reason, the processing may be executed by using representative pixels selected through sub-sampling (culling) if the processing needs to be expedited.

Figure 4:
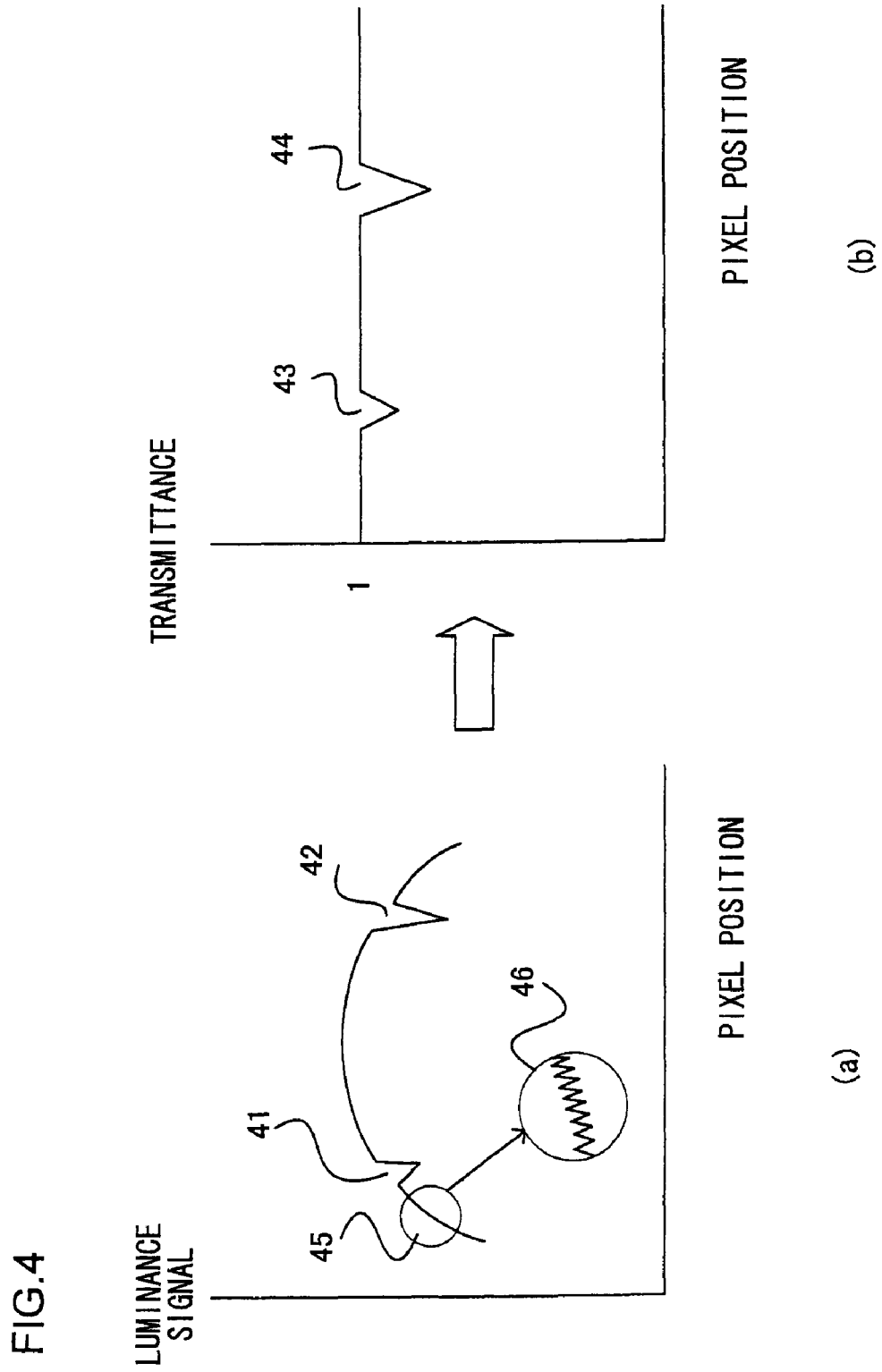
FIG. 4 illustrates local normalization processing executed on the luminance plane.

The processing executed to calculate the relative ratio over the (2a+1)×(2b+1) pixel range is referred to as local normalization processing (gain extraction processing). The filter used to calculate the relative ratio over the (2a+1)×(2b+1) pixel range may be referred to as a gain extraction kernel. FIG. 4 shows how the local normalization processing is executed on the luminance plane. FIG. 4(a) shows the luminance signals at pixels disposed along the horizontal direction within the luminance plane, with reference numerals 41 and 42 indicating that the presence of dust has lowered luminance signal values. FIG. 4(b) shows the results of the local normalization processing described above executed on the luminance signals in FIG. 4(a). Namely, it shows the results of the normalization processing executed on the pixel values over the local range. Reference numerals 43 and 44 respectively correspond to reference numerals 41 and 42 in FIG. 4(a), each indicating the transmittance at a point at which dust is present. Nonuniformity such as gradation and shading contained in the uniform surface data is thus eliminated, and the extent to which the transmittance has been lowered due to the dust shadows alone can be extracted. As a result, the positions at which the dust is present and the specific levels of transmittance at the individual positions can be ascertained at the same time.

2-2) Low Pass Processing on Transmittance Map

While low pass processing on the transmittance map may be optional, it is more desirable to execute this processing since it is mostly highly effective. Since the transmittance signal T[i,j] contains random noise attributable to the quantum fluctuation of the luminance signal, a dust shadow may be detected as mottling over an area where the transmittance is at a level close to 1 and a subtle effect of the dust shadow remains due to the randomness of the noise, if the threshold value decision-making in 2-4 below is executed directly on the transmittance map. The appearance of the image can be somewhat improved by grouping the mottled dust shadow through low pass filter processing expressed as in (3) below.

$$T[i,j]=\{4*T[i,j]+2*(T[i-1,j]+T[i+1,j]+T[i,j-1]+T[i,j+1])+1*(T[i-1,j-1]+T[i-1,j+1]+T[i+1,j-1]+T[i+1,j+1])\}/16 \quad (3)$$

2-3) Statistical Analysis of Transmittance Map

Next, a statistical analysis is executed by calculating an average value M as expressed in (4) below over the entire image plane of the transmittance map obtained through the local normalization processing described earlier and then calculating a standard deviation σ as expressed in (5) below. It is to be noted that Nx and Ny respectively indicate the total numbers of pixels present along the x direction and the y direction.

$$M = \frac{1}{N_x N_y} \sum_{i,j} T[i, j] \quad (4)$$

$$\sigma = \sqrt{\frac{1}{N_x N_y} \sum_{i,j} (T[i, j] - M)^2} \quad (5)$$

2-4) Threshold Value Decision-Making

Figure 5:
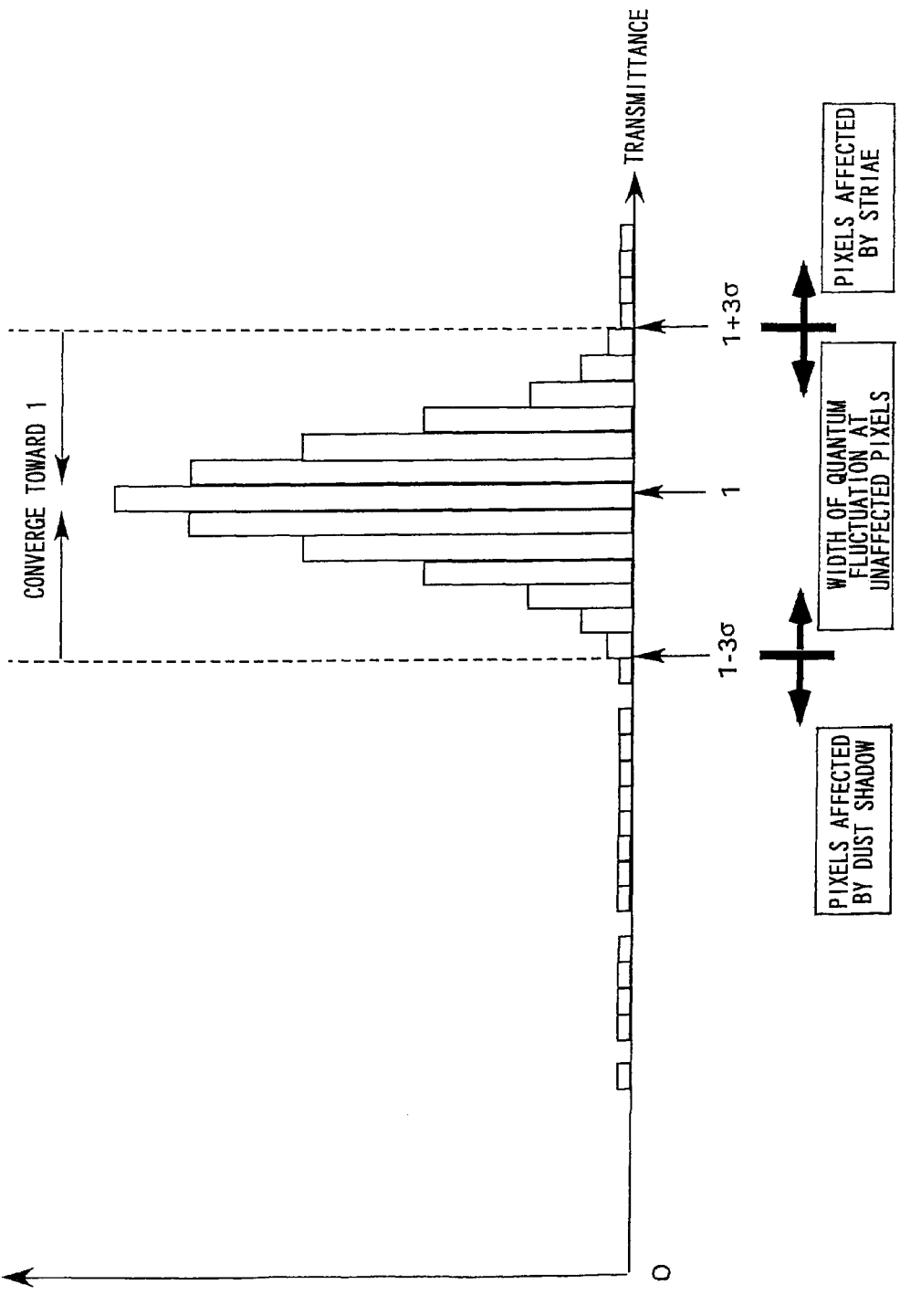
FIG. 5 shows a histogram of the transmittance map.

The aerial ratio of dust signals in the transmittance map is basically very small, and the results of the statistical analysis executed as described in 2-3 reflect the evaluation of the random noise (shot noise) attributable to the quantum fluctuations of the transmittance signals. Reference numeral 46 in FIG. 4, which is an enlargement of an area indicated with reference numeral 45, indicates manifestation of fine random noise. A histogram of the transmittance map shows a normal distribution of the standard deviation σ around the average value M (M is a value very close to 1). FIG. 5 shows the histogram of the transmittance map. Since the fluctuations in this range are considered to be unaffected by the change in the transmittance attributable to dust shadows, the transmittance may be forcibly set to 1. Namely, threshold value decision-making is executed in conformance to the conditions expressed in (6) and (7) below $$\text{if } |T[i,j]-M| \leq 3\sigma \text{ then } T[i,j]=1 \quad (6)$$

$$\text{else } T[i,j]=T[i,j] \quad (7)$$

Since 99.7% of the normally distributed random data concentrate within the range of ±3σ, the effect of the random noise can be eliminated with a fair degree of accuracy by processing the data in this range. Any signal indicating a transmittance value outside the ±3σ range, which cannot be attributed to a statistical error, is an abnormal signal considered to indicate a phenomenon caused by a lowered transmittance due to a dust shadow. If a dust shadow is present in such an abnormal area, the transmittance normally indicates a value smaller than 1.

However, the transmittance may indicate a value greater than 1 although this does not happen very often. Such a phenomenon is not due to a dust shadow and is observed when, for instance, interference fringes, which manifest as the incident light is intensified or attenuated, are induced by a defect attributable to a stria (nonuniformity in the refractive index) of the optical lowpass filter or the like. For this reason, the method according to the present invention can be adopted to detect a defect other than dust present at an optical member disposed in the optical path. In addition, the adverse effect of a defect at the pixel in the image sensor, too, can be detected through the method. While dust present at a position close to the image sensor 8 tends to appear with more clarity without becoming blurred, even dust present on the photographic lens, which is bound to appear fairly blurred in the photographed image, can be detected with a high level of accuracy.

It is to be noted that the threshold value decision-making should be executed in conformance to the conditions expressed as in (8), (9) and (10) below if the adverse effect of dust shadows only needs to be eliminated.

$$\text{if } |T[i,j]-M| \leq 3\sigma \text{ then } T[i,j]=1 \quad (8)$$

$$\text{else if } T[i,j]>1 \, T[i,j]=1 \quad (9)$$

$$\text{else } T[i,j]=T[i,j] \quad (10)$$

Since the average value M used in the decision-making always takes a value close to 1, the value 1 may substitute for M.

Through the processing described above, two types of defect information, i.e., map information indicating defective pixel positions (obtained by making a decision as to whether or not T=1) and transmittance information indicating the degree of each defect, can be obtained at once. It is to be noted that the transmittance map described above, which indicates the local relative gains, may be alternatively referred to as a gain map.

Under normal circumstances, a defect such as the presence of dust is detected by using a differential filter for edge detection. However, dust present within the optical path becomes optically blurred and manifests as a dust shadow having extremely low contrast with the surrounding area. In such a case, the sensitivity of the differential filter is often not even close to being high enough and the low contrast dust shadow can hardly be detected. By adopting the decision-making method based upon the statistical characteristics of the transmittance described above, an extremely high sensitivity dust detection is enabled and it becomes possible to correct the adverse effect of target dust present within the optical path.

(Processing on Correction Target Image)

3) Gain Correction

In step S13, gain correction is executed. The correction target image data are corrected by using the transmittance map having been obtained through the method described above. The gain correction is executed by individually multiplying the R, G and B values indicated in the correction target image data by the reciprocal of the transmittance signal value as indicated in (11), (12) and (13) below.

$$R[i,j]=R[i,j]/T[i,j] \quad (11)$$

$$G[i,j]=G[i,j]/T[i,j] \quad (12)$$

$$B[i,j]=B[i,j]/T[i,j] \quad (13)$$

Through the processing described above, the intensity lowered by dust shadows can be successfully corrected. In addition, since the transmittance map undergoes the threshold value decision-making to determine data that do not require correction, no superfluous correction is executed. Namely, since the effect of the random noise is already removed from the transmittance T in an area free of dust, the noise in the R, G and B signals is not amplified.

As described above, by adopting the first embodiment, it is possible to correct in a desirable manner an image that has been photographed at any time point with a standard electronic camera that does not include a special mechanism for anti-dust measures. Since the uniform surface photographed to obtain the reference image does not need to achieve perfect uniformity, the uniform surface image can be obtained with relative ease. Furthermore, compared to dust detection methods in the related art, superior sensitivity is assured both in the detection and in the correction.

Second Embodiment

In the second embodiment, a single reference image photographed to obtain dust information is used for dust shadow removal in conjunction with a plurality of images photographed under varying optical photographing conditions. Since the structures of the electronic camera 1 and the PC 31 functioning as the image processing apparatus are identical to those in the first embodiment, their explanation is omitted.

Figure 7:
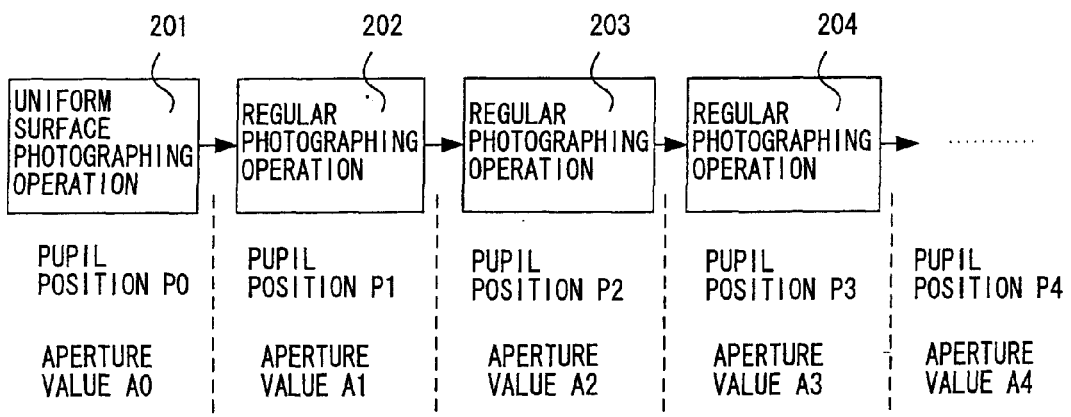
FIG. 7 shows the photographing procedure executed on the electronic camera side in a second embodiment.

(Operation Executed on Electronic Camera Side)
FIG. 7 shows the photographing procedure executed at the electronic camera 1 in the second embodiment.
1) A uniform surface photographing operation 201 is executed at a pupil position P0 and an aperture value A0 and reference image data 0 are output.
2) A regular photographing operation 202 is executed at a pupil position P1 and an aperture value A1 and correction target image data 1 are output.
3) A regular photographing operation 203 is executed at a pupil position P2 and an aperture value A2 and correction target image data 2 are output.
4) A regular photographing operation 204 is executed at a pupil position P3 and an aperture value A3 and correction target image data 3 are output.
Namely, the electronic camera 1 is first held toward the sky or a wall surface to photograph a uniform surface (uniform surface photographing operation) and subsequently, a photographing operation is performed by holding the electronic camera 1 toward a subject to be photographed any time (normal photographing operation).

It is assumed that the reference image is photographed at the aperture value A0 corresponding to a state in which the aperture opening is narrowed to the greatest possible extent within the adjustment range of the variable optical system 3. In the case of a standard lens, the aperture value corresponding to the aperture opening being narrowed to the greatest extent may be, for instance, approximately F22. A correction target image is photographed with the aperture value set equal to the aperture value when photographing the reference image or set to a value further toward the open side.

The uniform surface photographing operation does not need to be repeatedly performed as long as the state of the dust presence remains unchanged. While it is naturally more desirable to perform a uniform surface photographing operation as many times as possible, even data obtained once a day can be normally effectively used as dust data. It is left to the photographer's discretion as to whether or not to perform a uniform surface photographing operation in a given situation. However, if a considerable length of time has elapsed since the most recent uniform surface photographing operation, the reference data having been obtained through the uniform surface photographing operation may not be very reliable. Accordingly, reference image data obtained through a uniform surface photographing operation may be used only in conjunction with image data obtained through a regular photographing operation performed within a predetermined length of time following the uniform surface photographing operation. In addition, the uniform surface photographing operation does not need to be performed prior to a regular photographing operation. Reference image data obtained by subsequently performing a uniform surface photographing operation may be used instead. If the uniform surface photographing operation has been performed a plurality of times prior to and following a regular photographing operation, the reference image data having been obtained through the uniform surface photographing operation closest in time to the regular photographing operation may be used. If there is a likelihood of new dust having become adhered recently, the reference image data having been obtained through the uniform surface photographing operation either the closest or the second closest in time to the regular photographing operation prior to or following the regular photographing operation may be selectively used.

Figure 12:
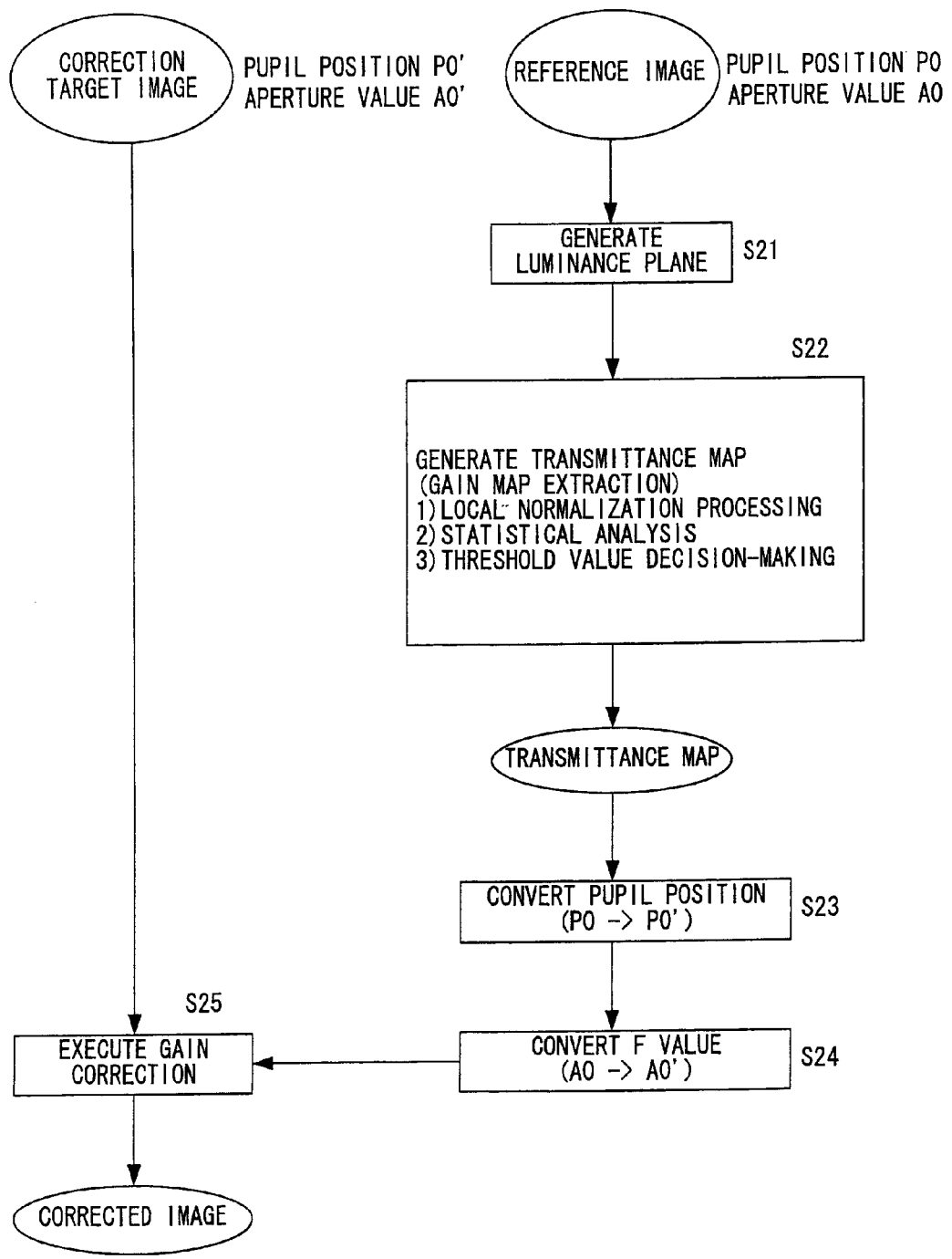
FIG. 12 presents a flowchart of the processing executed by the PC in the second embodiment.

(Operation Executed on Image Processing Apparatus Side)
It is assumed that pupil position and aperture value identification data are embedded both in reference image data and target image data input to the PC 31 functioning as the image processing apparatus. The pupil position data may be obtained through calculation by using a conversion table based upon a recorded data embedded in the photographic data, indicating the lens type, the zoom position and the focal point position. FIG. 12 presents a flowchart of the processing executed at the PC 31.

(Processing on Reference Image)
1) Generation of Luminance Plane and Generation of Transmittance Map A luminance plane is generated in step S21 and a transmittance map is generated in step S22, as in the first embodiment.
2) Pupil Position Conversion of Transmittance Map In step S23, pupil position conversion is executed for the transmittance map. The pupil position conversion is executed so as to convert the position of dust in the reference image to a dust position at which the dust is predicted to appear when viewed from the pupil position having been assumed for the correction target image. FIG. 8 shows how the position of a dust shadow changes as the pupil position changes. FIG. 8(a) shows the relationship among the pupil position, dust and the image-capturing surface at the image sensor 8. FIG. 8(b) shows how the change in the pupil position causes the dust shadow to move on the image-capturing surface.

As FIG. 8 clearly indicates, the position of a dust shadow appearing in the image becomes shifted along the direction of the radius vector from an optical axis 51, i.e., from the center of the image, as the pupil position is altered. Under such circumstances, there is estimated the extent Δr by which the position of a dust shadow present at a position distanced from the optical axis 51 by a distance r in the image becomes displaced along the direction of the radius vector. With P0 representing the pupil position assumed when taking the reference image and P0' representing the pupil position assumed when taking the correction target image and also assuming that dust is present at a position distanced from the image-capturing surface by a distance 1, Δr can be calculated as expressed in (14) below.

$$\Delta r = r \cdot \frac{l}{P_0 - l} \cdot \frac{P_0 - P_0'}{P_0} \qquad (14)$$

It is to be noted that the distance l indicates a value obtained by converting the thickness of the optical component to the length of the optical path represented in the air.

By displacing the transmittance map T[i,j] corresponding to the reference image to [r',θ] as expressed in (15) below on a polar coordinate system [r,θ], the transmittance map is converted to a transmittance map T' [i,j] on the coordinates [i,j]

$$r' = r + \Delta r = r\left(1 + \frac{l}{P'_0 - l} \cdot \frac{P_0 - P'_0}{P_0}\right) \quad (15)$$

The extent of shift Δr increases as the distance from the optical axis 51 increases. Depending upon the value of the pupil position, the shift may range over several tens of pixels in the peripheral area of an actual image.

3) F value Conversion of Transmittance Map

In step S24, F value conversion of the transmittance map is executed. If the aperture value set when photographing the reference image and the aperture value set when photographing the correction target image are different from each other, the dust diameters and the transmittance values in the reference image are converted through the F value conversion to dust diameters and transmittance values corresponding to the aperture value set further on the open side to photograph the correction target image. FIG. 9 shows how the size of a dust shadow changes as the F value, indicating the aperture value, changes. FIG. 9(a) shows the dust shadow size corresponding to a large F value and FIG. 9(b) shows the dust shadow size corresponding to a small F value. As FIG. 9 clearly indicates, the following expression (16) is obtained by applying the defining expression (F=focal length/effective aperture at lens) for the F value to the distance l between the image-capturing surface and the position at which the dust is present and the range of the dust Γ both achieving similitude.

$$\Gamma = \frac{l}{F} \quad (16)$$

By dividing l by the pixel pitch a (mm/pixel) of the image sensor, the dust diameter can be indicated as a specific number of pixels. Thus, the point image dust is estimated to spread over a width Γ when the aperture value is indicated with an F value.

At the same time, since the dust shadow can be regarded to be spread with light uniformly irradiated on the point image dust with individual angles of incidence at the lens with the aperture opened within the aperture value, the distribution function of the point image can be assumed to have a completely uniform spread. Accordingly, the F value conversion can be achieved through uniform low pass filter processing, the filter width Γ of which is expressed with a specific number of pixels, to estimate the dust diameter and the transmittance with a high level of accuracy. While a circular non-separation type filter with a diameter Γ is normally used, a square separation type filter with a length Γ and a width Γ may be used instead to speed up the processing.

For instance, let us consider conversion of a transmittance map obtained at F22 when l=0.5 mm and a=5 μm/pixel to transmittance maps at F16, F11, F8, F5.6 and F4. The one-dimensional filter coefficients used at the square separation type filter are indicated as in FIG. 10. By using the one-dimensional filter coefficients listed in FIG. 10, the data are filtered along the vertical direction and the horizontal direction. It is to be noted that the one-dimensional filter coefficients corresponding to the aperture value F16 include a total of seven coefficients with coefficients 0.5 set at the two ends, so that the dust shadow spreading over an even number of pixels is filtered over an odd number range containing a uniform number of pixels present above, below, to the left and to the right around the target pixel. FIG. 11 shows the aperture value F16 filter expressed as a two-dimensional filter.

Through the conversion processing described above, the transmittance map of the reference image is converted to a transmittance map with a pupil position and an F value matching those of the correction target image. Namely, a transmittance map equivalent to the transmittance map that would be generated under optical conditions identical to those under which the correction target image is photographed is generated based upon the transmittance map of the reference image.

(Processing on Correction Target Image)

3) Gain Correction

In step S25, gain correction is executed by using the transmittance map resulting from the conversion processing described above. As in the first embodiment, the gain correction is executed by individually multiplying the R, G and B values indicated in the correction target image data by the reciprocal of the value indicated by the transmittance signal having undergone the pupil position/F value conversion, as expressed in (17), (18) and (19) below.

$$R[i,j] = R[i,j]/T'[i,j] \quad (17)$$

$$G[i,j] = G[i,j]/T'[i,j] \quad (18)$$

$$B[i,j] = B[i,j]/T'[i,j] \quad (19)$$

Figure 13:
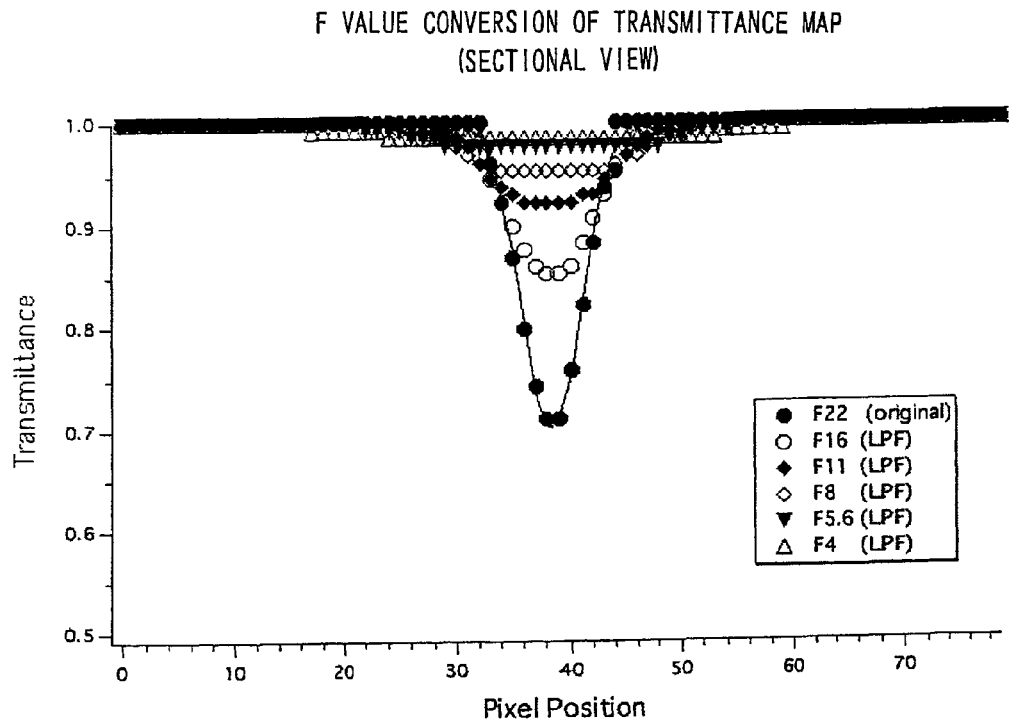
FIG. 13 shows how the transmittance is converted through F value conversion at a position where dust in a medium size is present.

FIG. 13 shows how the transmittance at a position where medium-size dust is converted through the F value conversion. The pixel position is indicated along the horizontal direction, whereas the transmittance is indicated along the vertical axis.

Once a single reference image is photographed at the smallest aperture value setting with the variable optical system, no more reference image needs to be photographed under different optical conditions. Namely, effective correction can be achieved by converting the dust data from the single reference image in correspondence to a specific correction target image. As a result, the onus placed on the user of the electronic camera is greatly reduced. In addition, as in the first embodiment, a very high level of sensitivity in dust detection is assured without requiring photographing of a perfectly uniform image.

Third Embodiment

In the third embodiment, dust shadows in the correction target image are detected and eliminated without using any uniform surface reference image. The method adopts a basic principle that once a flat area (local image area over which the image is uniform) is found in the correction target image, the dust transmittance map generation processing (gain map extraction) executed on the reference image in the first embodiment can also be executed in conjunction with the correction target image. Since the electronic camera 1 and the PC 31 functioning as the image processing apparatus adopt structures similar to those in the first embodiment, their explanation is omitted.

(Operation Executed on Electronic Camera Side)

Figure 14:
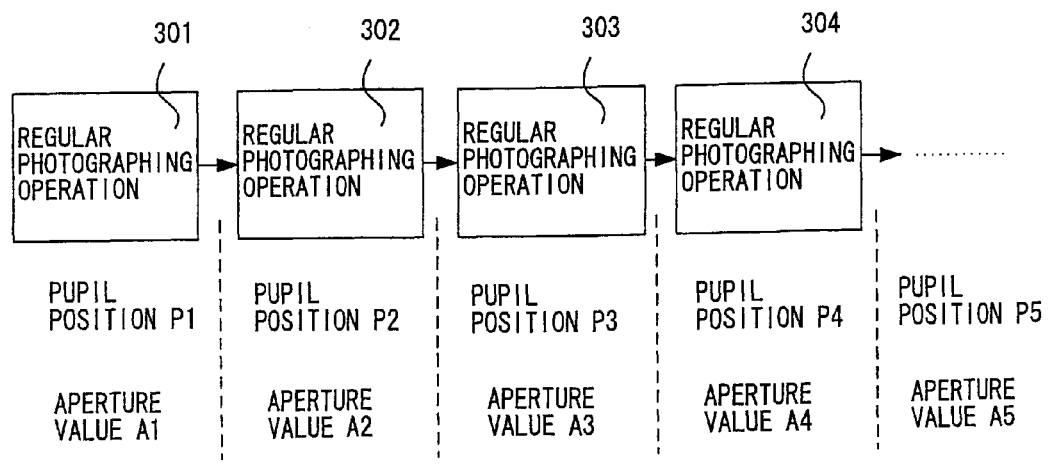
FIG. 14 shows the photographing procedure executed on the electronic camera side in a third embodiment.

FIG. 14 shows the photographing procedure executed at the electronic camera 1 in the third embodiment.

1) A regular photographing operation 301 is executed at a pupil position P1 and an aperture value A1 and correction target image data 1 are output.
2) A regular photographing operation 302 is executed at a pupil position P2 and an aperture value A2 and correction target image data 2 are output.
3) A regular photographing operation 303 is executed at a pupil position P3 and an aperture value A3 and correction target image data 3 are output.
4) A regular photographing operation 304 is executed at a pupil position P4 and an aperture value A4 and correction target image data 4 are output.
Namely, in the third embodiment, no uniform surface photographing operation is executed, unlike in the first embodiment and the second embodiment.

(Operation Executed on Image Processing Apparatus Side)
(Processing on Correction Target Image)

Figure 15:
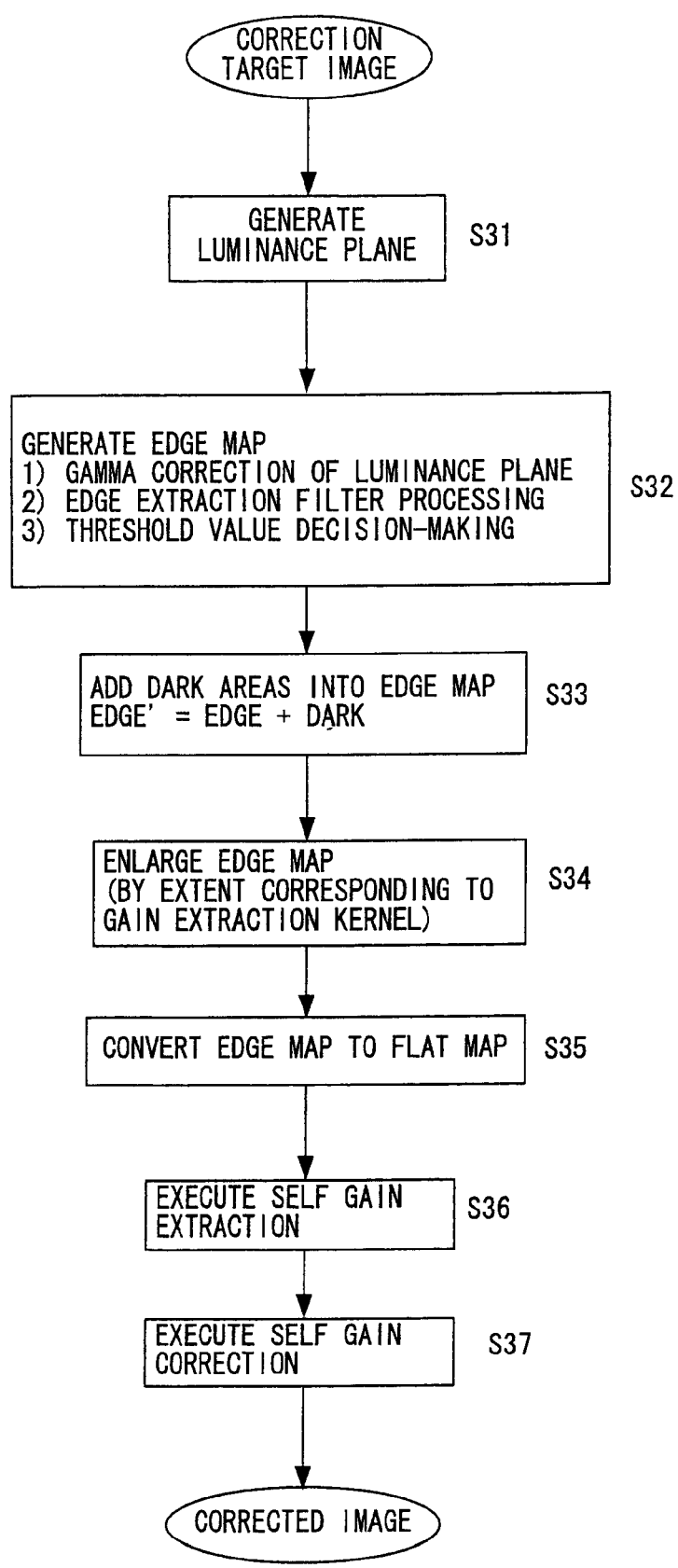
FIG. 15 presents a flowchart of the processing executed by the PC in the third embodiment.

FIG. 15 presents a flowchart of the processing executed at the PC 31 functioning as the image processing apparatus. In step S31, a luminance plane is generated. In step S32, an edge map is generated by executing gamma correction, edge extraction filter processing and threshold value decision-making on the luminance plane. In step S33, processing for adding dark areas to the edge map is executed. In step S34, processing for enlarging the edge map is executed. In step S35, the edge map is converted to a flat map. In step S36, self gain extraction processing is executed. In step S37, self gain correction processing is executed. The following is a detailed explanation of the individual processing steps.

1) Generation of Luminance Plane (Step S31)

The R, G and B signals are converted to a luminance signal Y for each pixel [1,j] in the correction target image data. The conversion is executed through a method similar to that adopted in conjunction with the reference image in the first embodiment.

2) Generation of Edge Map (Step S32)

An edge extraction filter is applied to the luminance plane to separate flat areas from edges within the correction target image. Dust present within the optical path, which manifests as dust shadows with extremely low contrast in the photographic image, often remains undetected by an edge extraction filter in the related art. Accordingly, one is allowed to assume that a great number of edge portions extracted through the edge extraction filter are not dust but actual edges in the image. In order to distinguish the edges in the image from the dust with an even higher level of accuracy, gradation correction processing is executed first on the luminance plane.

2-1) Gamma Correction of Luminance Plane

Let us assume that the correction target image expressed with linear gradation has been input and the luminance plane has been generated as described above. Gradation conversion such as that expressed in (20) below is then executed on the luminance plane, with Y representing the input signal ($0 \leq Y \leq Y_{max}$) and Y' representing the output signal ($0 \leq Y' \leq Y'_{max}$) in expression 20. It is to be noted that γ may assume a value of 0.4, 0.5, 0.6 or the like.

$$Y' = Y'_{max}\left(\frac{Y}{Y_{max}}\right)^{\gamma} \quad (20)$$

Through this conversion processing, the contrast of intermediate tones on the lower intensity side is raised and the contrast on the higher intensity side is lowered. Namely, since a dust shadow tends to be less noticeable in a dark image area and tends to be more noticeable in a bright image area, the contrast of the dust shadows is lowered through this conversion, whereas the relative contrast of normal image edges, which are primarily distributed in the mid tone ranges is raised through the conversion. As a result, a high level of separation is achieved with regard to the contrast of dust shadows and the contrast of normal edges. In addition, it is most desirable to set γ to 0.5 based upon the law of propagation of errors, in order to ensure that the converted data allow uniform handling of the shot noise attributable to quantum fluctuation of Y' over the full gradation range. It is to be noted that expression (20) above is a power function. When γ=0.5, the power function is a square root function.

If the input image has already undergone gamma correction processing in preparation for the final output and the gamma correction processing having been executed is similar to the conversion described above, the processing may be skipped. In addition, by executing the processing after first restoring the image to a linear gradation image through inverse gamma correction, a higher level of separation is achieved.

2-2) Edge Extraction Filter Processing

Next, the edge extraction filter is applied to the luminance plane having undergone the gamma correction, as shown in FIG. 16 and expressed in (21) below. YH[i,j] represents the edge extraction component at each pixel.

$$\begin{aligned}YH[i,j] = \{ & |Y'[i-1,j] - Y'[i,j]| + |Y'[i+1,j] - Y'[i,j]| + \\ & |Y'[i,j-1] - Y'[i,j]| + |Y'[i,j+1] - Y'[i,j]| + \\ & |Y'[i-1,j-1] - Y'[i,j]| + |Y'[i+1,j+1] - Y'[i,j]| + \\ & |Y'[i-1,j+1] - Y'[i,j]| + |Y'[i+1,j-1] - Y'[i,j]| + \\ & |Y'[i-2,j-1] - Y'[i,j]| + |Y'[i+2,j+1] - Y'[i,j]| + \\ & |Y'[i-2,j+1] - Y'[i,j]| + |Y'[i+2,j-1] - Y'[i,j]| + \\ & |Y'[i-1,j-2] - Y'[i,j]| + |Y'[i+1,j+2] - Y'[i,j]| + \\ & |Y'[i-1,j+2] - Y'[i,j]| + |Y'[i+1,j-2] - Y'[i,j]| + \\ & |Y'[i-3,j] - Y'[i,j]| + |Y'[i+3,j] - Y'[i,j]| + \\ & |Y'[i,j-3] - Y'[i,j]| + |Y'[i,j+3] - Y'[i,j]| + \\ & |Y'[i-3,j-3] - Y'[i,j]| + |Y'[i+3,j+3] - Y'[i,j]| + \\ & |Y'[i-3,j+3] - Y'[i,j]| + |Y'[i+3,j-3] - Y'[i,j]|\}/24\end{aligned} \quad (21)$$

The filter is designed to evenly collect data indicating absolute value differences representing a plurality of correlational distances from all directions so as to extract all the edges in the original image.

2-3) Threshold Value Decision-Making

By using expressions (22) and (23) below, the threshold value decision-making is executed on the edge extraction component YH to classify it as an edge portion or a flat portion, and the results of the decision are output to an edge map EDGE [i,j]. A threshold value Th1 assumes a value of approximately 1 to 5 in conjunction with the 255 gradations. Even if a dust shadow is present on an edge portion, the dust shadow is basically buried within a signal vibrating at the edge portion and thus, no dust shadow elimination processing needs to be executed over the area.

if $YH[i,j] > Th1$ EDGE$[i,j]$=1(edge portion) \quad (22)

else EDGE$[i,j]$=0(flat portion) \quad (23)

As described above, weighting on the various gradation levels is adjusted through the gradation conversion executed as described in 2-1) and then the threshold value decision-making is executed by using a constant threshold value Th1 over the entire gradation range, as disclosed in 2-1). However, substantially similar effects can be achieved by extracting edges in the image expressed with the initial linear gradations and executing threshold value decision-making with threshold values set in correspondence to specific luminance levels, instead.

3) Addition of Dark Areas to Edge Map (Step S33)

The edge map indicates areas that should not undergo gain map extraction. It is not desirable to execute the gain map extraction on dark areas as well as edge areas. Since the S/N ratio is poor in a dark area, the reliability of the relative gain extracted from the dark area would be low. In addition, since a dust shadow present on the dark area is hardly noticeable, it is not necessary to execute dust shadow elimination processing. Accordingly, dark areas, too, are added to the edge map as expressed in (24) below. A threshold value Th2 should be set to a value of 20 or smaller in conjunction with the 255 linear gradations. A schematic description "EDGE'=EDGE+DARK" may facilitate understanding of this operation.

$$\text{if } Y[i,j] = <Th2 \text{ EDGE}[i,j]=1 \quad (24)$$

4) Edge Map Enlargement Processing (Step S34)

As in the first embodiment, a transmittance map is generated by comparing the relative ratio of the value at the central pixel among the (2a+1)×(2b+1) pixels and the average value within a flat area. Accordingly (2a+1)×(2b+1) pixel range enlargement processing is executed in advance, as expressed in (25) below for edge portions so as to exclude the edge portions from the kernel. It is to be noted that m=1, 2, ... a and that n=1, 2, ... b.

$$\text{if EDGE}[i,j]=1 \text{ EDGE}[i\pm m,j\pm n]=1 \quad (25)$$

5) Conversion to Flat Map (Step S35)

The edge map EDGE [i,j] is converted to a flat map FLAT [i,j] as expressed in (26) and (27) below. This conversion is achieved through bit inversion. A flat area indicated in the flat map represents an area where self gain extraction may be executed in the correction target image by using the gain map extraction kernel constituted with (2a+1)×(2b+1) pixels.

$$\text{if EDGE } [i,j]=0 \text{ FLAT}[i,j]=1 \text{(flat portion)} \quad (26)$$

$$\text{else FLAT}[i,j]=0 \text{(edge portion)} \quad (27)$$

6) Self Gain Extraction (Step S36)

The processing for generating the transmittance map based upon the reference image data executed in the first embodiment is executed only for areas where FLAT[i,j]=1.

6-1) Local Normalization Processing (Gain Extraction Processing)

Based upon the relative ratio within the (2a+1)×(2b+1) pixel range, T[i,j] in each area where FLAT[i,j]=1 is generated. T[i,j] is invariably set to 1 in all the areas where FLAT [i,j]=0.

6-2) Statistical Analysis of Transmittance Map

Statistical analysis of T[i,j] in each area where FLAT[i,j]=1 is executed as in the first embodiment to calculate an average value m and a standard deviation a.

6-3) Threshold Value Decision-Making

Threshold value decision-making is executed as in the first embodiment with regard to T[i,j] within each area where FLAT[i,j]=1, and T[i,j] is set to 1 if it takes a value of m±3σ.

7) Self Gain Correction (Step S37)

Self gain correction is executed by multiplying the individual R, G and B values in the correction target image with the reciprocal of the value indicated by the transmittance signal T[i,j] obtained through the self extraction, as in the first embodiment.

Thus, even without any uniform surface reference image data, dust shadows in the correction target image itself can be extracted through self extraction and be corrected. Namely, each area within a given photographic image that satisfies predetermined conditions to assure that the area is flat is extracted. The extracted area is used both as a reference image and a correction target image. In addition, it is not necessary to take into consideration the effect attributable to the variable optical system in the third embodiment. It is particularly effective when eliminating a great number of small dust shadows.

Fourth Embodiment

While the fourth embodiment is similar to the second embodiment in that information related to dust positions obtained by photographing a single reference image is used, a transmittance map is obtained in the fourth embodiment through self extraction executed on the correction target image itself, as in the third embodiment, instead of generating a transmittance map from the reference image. While the transmittance map undergoes the pupil position conversion in the second embodiment, an error may occur in the pupil position conversion if a value indicating the pupil position is an approximate value instead of the exact value. In the third embodiment, on the other hand, dust with a significant size may be extracted as an edge in the edge map extraction and be left uncorrected. The fourth embodiment addresses such problems of the second embodiment and the third embodiment. Namely, it adopts the highly reliable transmittance map generation method achieved in the third embodiment and, at the same time, highly reliable dust position information obtained as in the second embodiment is used for correction. It is to be noted that since the electronic camera 1 and the PC 31 functioning as the image processing apparatus adopt structures identical to those in the first embodiment, their explanation is omitted.

(Operation Executed on Electronic Camera Side)

The photographing procedure is similar to that executed in the second embodiment.

(Operation Executed on Image Processing Apparatus Side)

FIG. 17 presents a flowchart of the processing executed at the PC 31 functioning as the image processing apparatus.

(Processing on Reference Image)

1) A luminance plane is generated in step S41, as in the first embodiment and the second embodiment.

2) A transmittance map is generated (gain map extraction) in step S42, as in the first embodiment and the second embodiment.

3) Pupil position conversion for the transmittance map is executed in step S43, as in the second embodiment.

4) F value conversion for the transmittance map is executed in step S44, as in the second embodiment.

5) Threshold Value Decision-Making on Transmittance Map

In step S45, threshold value decision-making is executed on the transmittance map. Following the F value conversion executed on the transmittance map, dust shadows will have almost disappeared through the low pass filter processing and transmittance values close to 1 will be indicated for a large number of pixels. In order to distinguish such nearly invisible dust shadows from distinct dust shadows, threshold value decision-making is executed again, as expressed in (28) and (29). For this decision-making, the standard deviation value σ having been calculated in the "transmittance map generation" step in 2) is reused. T' [i,j] represents the transmittance map having undergone the pupil position conversion and the F value conversion.

$$\text{if } |T'[i,j]-1|=<3\sigma \text{ then } T'[i,j]=1 \qquad (28)$$

$$\text{else } T'[i,j]=T'[i,j] \qquad (29)$$

6) Conversion to Dust Map

In step S46, the transmittance map is converted to dust map dmap[i,j] by binarizing the transmittance map as expressed in (30) and (31) below.

$$\text{if } T'[i,j]<1 \ dmap[i,j]=1 \qquad (30)$$

$$\text{else } dmap[i,j]=0 \qquad (31)$$

The decision-making executed as expressed in (30) may instead be executed by making a decision as to whether or not T' [i,j] is smaller than 0.95 so as to allow a slightly greater margin.

7) Dust Map Enlargement Processing

In step S47, a dust map containing dust shadows in areas falling within an allowable error range is created by enlarging the dust map as expressed in (32) below by an extent corresponding to the error expected to have manifested as a result of the pupil position conversion. In this example, an error, the extent of which corresponds to 3 pixels, for instance, is assumed. It is to be noted that m=1, 2, 3, and that n=1, 2, 3.

$$\text{if } dmap[i,j]=1 \ dmap[i\pm m, j\pm n]=1 \qquad (32)$$

(Processing on Correction Target Image)
1) A luminance plane is generated in step S51, as in the third embodiment.
2) An edge map is generated in step S52, as in the third embodiment.
3) Processing for adding dark areas in the edge map is executed in step S53, as in the third embodiment. A schematic description "EDGE'=EDGE+DARK" may facilitate understanding of this operation.
4) Excluding Dust Areas From Edge Map In step S54, dust areas are excluded from the edge map. While a majority of dust shadows are not extracted as edges due to their low contrast, shadows of large dust motes may have high contrast, and in such a case, they may be extracted as edges. In particular, if the correction target image is photographed by narrowing the aperture, a plurality of dust shadows may be extracted as edges. In order to ensure that these dust shadows are also specified as gain extraction areas instead of being regarded as edge areas, the dust positions are forcibly separated from the actual edge portions, as expressed in (33) below by using the dust map information having been obtained in step S46. Since it is not desirable to remove too much edge area data, the dust map yet to undergo the dust map enlargement processing in step S47 is used for these purposes. A schematic description "EDGE''=EDGE+DARK−DUST" may facilitate understanding of this operation.

$$\text{if } dmap[i,j]=1 \ EDGE[i,j]=0 \qquad (33)$$

4') Edge map peripheral assimilation processing (correction of clipped dust areas) (S 60)

Since it is unnatural to leave the edge map with dust areas unevenly clipped out (excluded), peripheral assimilation processing is executed within the edge map. For instance, as long as the background in the image is uniform, e.g., blue sky, no problem arises if portions with dust of significant size having been extracted as edge portions are clipped out from the edge map by using the dust map information obtained in step S46. Rather, they need to be clipped out. However, if portions indicated in the dust map information obtained in step S46 to have dust present thereat in an image containing a patterned or structured background are clipped out from the edge map, unnatural correction processing is bound to be executed based upon the relationship to the actual peripheral pattern or texture. Accordingly, if it is decided that there are a large number of edge pixels around a pixel having been determined to be a non-edge pixel, the pixel is reassigned as an edge portion.

Figures 18, 19:
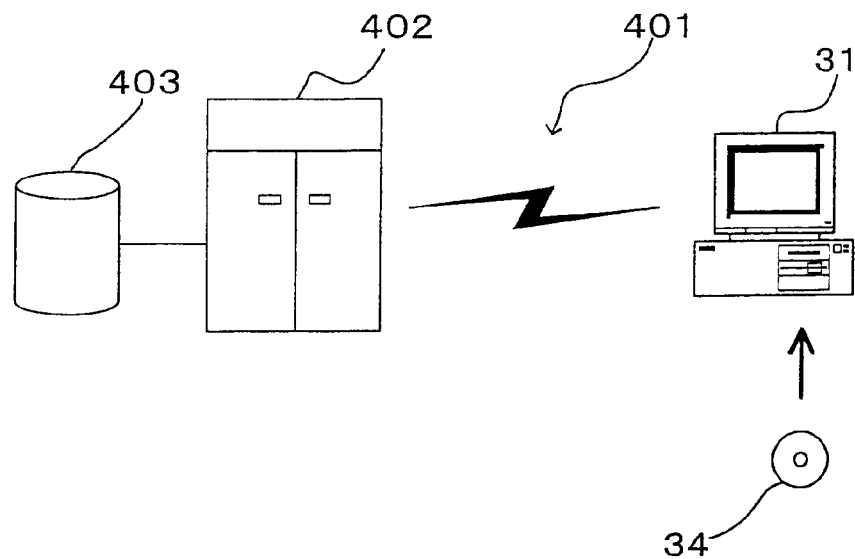

The edge map peripheral assimilation processing is executed as described below. More specifically, if more than four pixels, for instance, among the 8 marginal pixels (the filled pixels in FIG. 19, which only shows the fourth quadrant relative to the target pixel [i,j]=[0,0]) of the target pixel shown in FIG. 19 are edge pixels, the target pixel, too, is determined to be an edge pixel. When more than four marginal pixels are edge pixels, a majority of the marginal pixels are edge pixels. In other words, if a majority of the marginal pixels are edge pixels, the target pixel, too, is determined to be an edge pixel. It is to be noted that while the eighth pixels relative to the target pixel on the horizontal direction and the vertical direction are checked in the processing express below, marginal pixels do not need to be the eighth pixels relative to the target pixel. Pixels distanced from the target pixel by several pixels or 10 plus pixels may be checked as the marginal pixels. In addition, the following processing may be executed for all the pixels, or it may be executed only for pixels having indicated the value 1 for dmap [i,j] and having been clipped out from the edge map.

```
       Data copy for each pixel [i,j]
   tmp[i,j]=EDGE[i,j]
       Peripheral assimilation processing
   if  tmp[i,j]=0{
     sum = tmp[i−8,j]+tmp[i+8,j]+tmp[i,j−8]+tmp[i,j+8]
      +tmp[i−8,j−8]+tmp[i+8,j+8]+tmp[i−8,j+8]+tmp[i+8,j−8]
     if  sum>4        EDGE[i,j]=1
   }
```

5) The edge map enlargement processing is executed in step S55 as in the third embodiment.
6) The edge map is converted to a flat map in step S56 as in the third embodiment.
7) Identification of Self Gain Extraction Areas In step S57, self gain extraction areas are identified. In order to prevent erroneous correction of the correction target image, it is most reasonable to eliminate the dust shadows only in areas identified as flat areas with dust present. Accordingly, area information indicating areas satisfying these two requirements, i.e., an area that is flat and has dust present, is obtained as expressed in (34) below, and the information thus obtained is then used for substitution in the flat map. Namely, only when a flag with a value 1 is set for both FLAT and dmap, FLAT=1, and otherwise FLAT=0.

$$FLAT[i,j]=FLAT[i,j]*dmap[i,j] \qquad (34)$$

8) Self Gain Extraction

Unlike in the third embodiment, local normalization processing (gain extraction processing) alone is executed in the self gain extraction executed in step S58. No dust area limit processing through statistical analysis of the transmittance map and threshold value processing needs to be executed following the local normalization processing, since the gain extraction areas have already been narrowed down to areas around dust through the processing in 7). The local normalization processing (gain extraction processing) is executed as in the third embodiment. Thus, dust search is executed by expanding each gain extraction area surrounding the dust to an extent corresponding to the error in the pupil position conversion through the processing executed in step S47, so as to extract all the dust shadows without fail.

At this time, low pass processing is executed on the transmittance map having undergone the self extraction. Low pass processing similar to that executed in the first embodiment is executed for each area having undergone the self extraction of T[i,j] so as to remove the fluctuation component at the pixel [i,j] contained in T[i,j]. In the embodiment, the self gain correction is executed through the self gain extraction only on local areas with dust present without executing any threshold value processing based upon statistical analysis, and for this reason, the low pass processing plays a crucial role. Namely, since the pixel value and the transmittance value T[i,j] prior to the low pass processing fluctuate along the same direction, the local area will tend to take on a flat appearance if the self gain correction is executed as described later without first executing the low pass processing. Accordingly, by eliminating the fluctuation component from T[i,j], the pixel value can retain its fluctuation component so as to sustain dot continuity with the surrounding area. This proves to be highly effective particularly when correcting a noisy image such as a high sensitivity image. A low pass filter used in this step may be designed to have a slightly higher level of filtering strength compared to that used in the first embodiment. In addition, the low pass filter processing of large dust areas (areas showing T[i,j] values considerably smaller than 1) which tend to be readily affected by the low pass filter processing may be skipped.

9) Self Gain Correction

The self gain correction executed in step S59 is similar to that executed in the third embodiment. Since dust transmittance information is extracted from the correction target image itself, a clean correction, completely free of displacement is enabled even if the accuracy of the pupil position conversion executed on the transmittance map of the reference image is poor. It is to be noted that the self gain extraction is executed only for the self gain extraction areas having been identified in step S57. Accordingly, the correction processing, too, is executed over these ranges alone, resulting in a reduction in the processing load.

As described above, the fourth embodiment, in which the dust map information corresponding to the reference image is effectively utilized, dust shadows of all sizes, from a dust shadow ranging over a significant area to the shadow of a minuscule mote of dust, within the correction target image can be extracted in the self extraction processing without fail. In addition, when the accuracy of the pupil position conversion executed for the reference image transmittance map is poor, the fourth embodiment may be adopted as an alternative to the second embodiment. Also, as in the second embodiment, only a very small workload is placed on the photographer when photographing the reference image, as in the second embodiment.

With the image processing apparatus achieved in any of the first to fourth embodiments described above, defects such as black spots caused by dust or the like in an image photographed at a given operating time point under given operating conditions with an electronic camera can be corrected in a desirable manner and, as a result, a high quality image can be reproduced.

It is to be noted that while in the first, second and fourth embodiments described above, the photographer photographs an image considered to be almost uniform as the reference image in order to create a transmittance map and the transmittance map is generated through local normalization processing and the like executed on the photographed reference image. However, the subject to be photographed as the reference image, which is substantially uniform in the photographer's opinion, may actually contain small patterns or the like. In such a case, the reference image should be photographed basically by defocusing the subject. For instance, a sheet of paper being photographed to obtain the reference image may be photographed by placing it at a position closer to the camera than the minimum photographing distance of the lens. Even if small patterns are present, by defocusing the image so that the patterns change very gently over a range greater than the $(2a+1)\times(2b+1)$–pixel gain extraction kernel, a highly usable, substantially uniform reference image can be obtained.

In addition, in the fourth embodiment, self gain extraction areas are identified in step S57 and the correction is executed over the identified ranges in step S58. This aspect of the fourth embodiment, narrowing down the correction ranges to ranges around dust (surrounding areas), may be adopted in the first to third embodiments, as well. If adopted in the first to third embodiments, the presence of dust should be detected by using the transmittance map having been generated and then the surrounding areas around the dust should be determined.

An explanation has been given with regard to the third embodiment on processing through which a single photographic image is obtained and a dust map is generated by extracting flat areas in the photographic image. However, if dust of a considerable size is present in a flat area, the area may not be extracted as a flat area. While this problem is addressed in the fourth embodiment by obtaining a reference image, a flat area containing dust of a significant size can also be recognized as a flat area for which defect information needs to be generated, based upon a correlation among a plurality of images without having to obtain a reference image. For instance, if an image area that is always detected in the edge extraction at the same position in a plurality of photographic images obtained by photographing different subjects, the detected image is highly likely to be an image of dust. Accordingly, an AND operation may be executed for a plurality of photographic images corresponding to edge map, which is processed as explained in reference to the third embodiment, and an area over which AND relationship is true among the plurality of images should be eliminated from the edge map. The AND area can then be added as a flat area, thereby making it possible to prepare a transmittance map even when dust of a considerable size is present. It is to be noted that an AND operation may be executed for data other than the edge map. The operation may be executed in conjunction with any data as long as they are generated based upon a photographic image and enable detection of dust on the photographic optical path through an AND operation executed for a plurality of photographic images. For instance, regardless of whether or not individual image areas are flat areas, the gain extraction kernel-based transmittance map may be forcibly generated for the entire image plane, and an AND operation may be executed so that if there is an image area extracted with similar transmittance rates at similar positions in a plurality of images, the image area is retained in the transmittance map to be used as defect information with the other image areas excluded from the defect information.

By executing an OR operation on a plurality of photographic images with respect to the transmittance map obtained over a flat area in the third embodiment, a transmittance map covering the entire photographic image plane can be created. The positions of the flat areas detected as in the third embodiment in the photographic image plane change in correspondence to different photographic subjects. The results of the OR operation of these flat areas may cover the entire photographic image plane. Accordingly, it is possible to obtain a transmittance map for the entire photographic image plane by using a plurality of photographic images, i.e., a plurality of correction target images, without having to photograph a special reference image to obtain dust information. The transmittance map for the entire photographic image plane can be used as a common transmittance map for the plurality of correction target images.

It is to be noted that when executing an AND operation on a plurality of photographic images corresponding to an edge map or when executing an OR operation on a plurality of photographic images to create a transmittance map as described above, the pupil positions and the F values (aperture values) of the individual photographic images may not match. In such a case, pupil position conversion and F value conversion should be executed on image signals or on transmittance map, as has been explained in reference to the second embodiment.

In addition, while an explanation is given above in reference to the embodiments on an example in which the present invention is adopted in conjunction with a Bayer array RGB colorimetric system, it goes without saying that the present invention may be adopted in conjunction with any color filter array, as long as the data ultimately undergo interpolation processing. The present invention may also be adopted with equal effectiveness in conjunction with other colorimetric systems (e.g., a complementary color colorimetric system).

Furthermore, while an explanation is given above in reference to the embodiments on an example in which the present invention is adopted in a single lens reflex electronic still camera that allows the use of exchangeable lenses, the present invention is not limited to this example. The present invention may be, for instance, adopted in cameras that do not allow the use of exchangeable lenses. The pupil position and the aperture value of the lens can be ascertained as necessary through a method in the known art.

While an explanation is given above in reference to the embodiments on an example in which image data obtained through a photographing operation executed in the electronic still camera 1 are processed, the present invention is not limited to this example. The present invention may be adopted to process image data photographed with a video camera which handles dynamic images. In addition, the present invention may be adopted to process image data photographed with a portable telephone equipped with a camera or the like. It may also be adopted in copiers and scanners as well. In other words, the present invention may be adopted to process all types of image data captured with image sensors.

While an explanation is given above in reference to the embodiments on an example in which the adverse effect of dust is eliminated through processing executed at the PC (personal computer) 31 on image data having been photographed with the electronic camera 1, the present invention is not limited to this example. A program that enables such processing may be installed in the electronic camera 1. Such a program may instead be installed in a printer, a projector or the like as well. In other words, the present invention may be adopted in all types of apparatuses that handle image data.

The program executed at the PC 31 may be provided in a recording medium such as a CD-ROM or through a data signal on the Internet or the like. FIG. 18 shows how this may be achieved. The PC 31 receives the program via a CD-ROM 34. In addition, the PC 31 is capable of achieving a connection with a communication line 401. A computer 402 is a server computer that provides the program stored in a recording medium such as a hard disk 403. The communication line 401 may be a communication network for Internet communication, personal computer communication or the like, or it may be a dedicated communication line. The computer 402 reads out the program from the hard disk 403 and transmits the program thus read out to the PC 31 via the communication line 401. Namely, the program embodied as a data signal on a carrier wave is transmitted via the communication line 401. Thus, the program can be distributed as a computer-readable computer program product adopting any of various modes including a recording medium and a carrier wave.

While the invention has been particularly shown and described with respect to preferred embodiments and variations thereof by referring to the attached drawings, the present invention is not limited to these examples and it will be understood by those skilled in the art that various changes in form and detail may be made therein without departing from the spirit, scope and teaching of the invention.

DRAWINGS

FIG. 1
A Variable Optical System
B CAMERA BODY
C CHANGE IN PUPIL POSITION
  FIG. 2
1 ELECTRONIC CAMERA
3 VARIABLE OPTICAL SYSTEM
7 OPTICAL COMPONENTS
8 IMAGE SENSOR
12 ANALOG SIGNAL PROCESSING UNIT
13 A/D CONVERSION UNIT
14 TIMING CONTROL UNIT
16 OPERATION UNIT
15 IMAGE PROCESSING UNIT
17 CONTROL UNIT
24 BUS
18 MEMORY
19 COMPRESSION/DECOMPRESSION UNIT
20 DISPLAY IMAGE GENERATION UNIT
21 MONITOR
22 MEMORY CARD INTERFACE UNIT
23 EXTERNAL INTERFACE UNIT
A LOAD/UNLOAD
30 MEMORY CARD
B LOAD/UNLOAD
32 MONITOR
33 PRINTER
  FIG. 3
101 REGULAR PHOTOGRAPHING OPERATION
A PUPIL POSITION P1
APERTURE VALUE A1
102 UNIFORM SURFACE PHOTOGRAPHING OPERATION
103 REGULAR PHOTOGRAPHING OPERATION
B PUPIL POSITION P2
APERTURE VALUE A2
104 UNIFORM SURFACE PHOTOGRAPHING OPERATION
C PUPIL POSITION P3
APERTURE VALUE A3
  FIG. 4
A Luminance Signal
B PIXEL POSITION
C TRANSMITTANCE
D PIXEL POSITION FIG. 5
A Number of Pixels
B HISTOGRAM OF TRANSMITTANCE MAP
B' CONVERGE TOWARD 1
C TRANSMITTANCE
D PIXELS AFFECTED BY DUST SHADOW
E WIDTH OF QUANTUM FLUCTUATION AT UNAFFECTED PIXELS
F PIXELS AFFECTED BY STRIAE
   FIG. 6
A Correction Target Image
PUPIL POSITION P0
APERTURE VALUE A0
B REFERENCE IMAGE
PUPIL POSITION P0
APERTURE VALUE A0
S11 GENERATE LUMINANCE PLANE
S12 GENERATE TRANSMITTANCE MAP (GAIN MAP EXTRACTION)
1) LOCAL NORMALIZATION PROCESSING
2) STATISTICAL ANALYSIS
3) THRESHOLD VALUE DECISION-MAKING
C TRANSMITTANCE MAP
S13 EXECUTE GAIN CORRECTION
D CORRECTED IMAGE
   FIG. 7
201 UNIFORM SURFACE PHOTOGRAPHING OPERATION
A PUPIL POSITION P0
APERTURE VALUE A0
202 REGULAR PHOTOGRAPHING OPERATION
B PUPIL POSITION P1
APERTURE VALUE A1
203 REGULAR PHOTOGRAPHING OPERATION
C PUPIL POSITION P2
APERTURE VALUE A2
204 REGULAR PHOTOGRAPHING OPERATION
D PUPIL POSITION P3
APERTURE VALUE A3
E PUPIL POSITION P4
APERTURE VALUE A4
   FIG. 8
A LENS
B IMAGE-CAPTURING SURFACE
C OPTICAL COMPONENT
D DUST
E BEFORE DISPLACEMENT: PUPIL POSITION P0
AFTER DISPLACEMENT: PUPIL POSITION P0' WITH P0>P0'
   FIG. 9
A LENS
B IMAGE-CAPTURING SURFACE
C OPTICAL COMPONENT
D DUST
E LENS
F IMAGE-CAPTURING SURFACE
G OPTICAL COMPONENT
H DUST
   FIG. 10
1 APERTURE VALUE
2 DUST DIAMETER
3 LPF SIZE
4 ONE DIMENSIONAL FILTER COEFFICIENTS
5 NOT NECESSARY TO EXECUTE CONVERSION PROCESSING FIG. 12
A Correction Target Image
PUPIL POSITION P0'
APERTURE VALUE A0'
B REFERENCE IMAGE
PUPIL POSITION P0
APERTURE VALUE A0
S21 GENERATE LUMINANCE PLANE
S22 GENERATE TRANSMITTANCE MAP (GAIN MAP EXTRACTION)
1) LOCAL NORMALIZATION PROCESSING
2) STATISTICAL ANALYSIS
3) THRESHOLD VALUE DECISION-MAKING
C TRANSMITTANCE MAP
S23 CONVERT PUPIL POSITION (P0→P0')
S24 CONVERT F VALUE (A0→A0')
S25 EXECUTE GAIN CORRECTION
D CORRECTED IMAGE
   FIG. 13
A F VALUE CONVERSION OF TRANSMITTANCE MAP (SECTIONAL VIEW)
S14
301 REGULAR PHOTOGRAPHING OPERATION
A PUPIL POSITION P1
APERTURE VALUE A1
302 REGULAR PHOTOGRAPHING OPERATION
B PUPIL POSITION P2
APERTURE VALUE A2
303 REGULAR PHOTOGRAPHING OPERATION
C PUPIL POSITION P3
APERTURE VALUE A3
304 REGULAR PHOTOGRAPHING OPERATION
D PUPIL POSITION P4
APERTURE VALUE A4
E PUPIL POSITION P5
APERTURE VALUE A5
   FIG. 15
a Correction Target Image
S31 GENERATE LUMINANCE PLANE
S32 GENERATE EDGE MAP
1) GAMMA CORRECTION OF LUMINANCE PLANE
2) EDGE EXTRACTION FILTER PROCESSING
3) THRESHOLD VALUE DECISION-MAKING
S33 ADD DARK AREAS INTO EDGE MAP
EDGE'=EDGE+DARK
S34 ENLARGE EDGE MAP (BY EXTENT CORRESPONDING TO GAIN EXTRACTION KERNEL)
S35 CONVERT EDGE MAP TO FLAT MAP
S36 EXECUTE SELF GAIN EXTRACTION
S34 EXECUTE SELF GAIN CORRECTION
B CORRECTED IMAGE
   FIG. 17
A Correction Target Image
B PUPIL POSITION P0'
APERTURE VALUE A0'
S51 GENERATE LUMINANCE PLANE
S52 GENERATE EDGE MAP
1) GAMMA CORRECTION OF LUMINANCE PLANE
2) EDGE EXTRACTION FILTER PROCESSING
2) THRESHOLD VALUE DECISION-MAKING
S53 ADD DARK AREA INTO EDGE MAP
EDGE'=EDGE+DARK
S54 EXCLUDE DUST AREA FROM EDGE MAP
EDGE"=EDGE+DARK−DUST
S60 EXECUTE PERIPHERAL ASSIMILATION PROCESSING FOR EDGE MAP (CORRECT CLIPPED DUST AREA)
S55 ENLARGE EDGE MAP (BY EXTENT CORRESPONDING TO GAIN EXTRACTION KERNEL)

S56 CONVERT EDGE MAP TO FLAT MAP
S57 IDENTIFY SELF EXTRACTION AREA FLAT AND DUST
S58 EXECUTE SELF GAIN EXTRACTION
S59 EXECUTE SELF GAIN CORRECTION
C CORRECTED IMAGE
D REFERENCE IMAGE
E PUPIL POSITION P0 APERTURE VALUE A0
S41 GENERATE LUMINANCE PLANE
S42 GENERATE TRANSMITTANCE MAP (GAIN MAP EXTRACTION)
1) LOCAL NORMALIZATION PROCESSING
2) STATISTICAL ANALYSIS
2) THRESHOLD VALUE DECISION-MAKING
F TRANSMITTANCE MAP
S43 CONVERT PUPIL POSITION (P0→P0')
S44 CONVERT F VALUE (A0→A0')
S45 EXECUTE THRESHOLD VALUE DECISION-MAKING
S46 CONVERT TRANSMITTANCE MAP TO DUST MAP
S47 ENLARGE DUST MAP (BY EXTENT CORRESPONDING TO PUPIL POSITION CONVERSION ERROR)

The invention claimed is:

1. An image processing apparatus comprising:
an image obtaining unit that obtains a photographic image captured with an image sensor;
a flat portion extraction unit that extracts a flat portion area within the photographic image having been obtained; and
a defect information generating unit that generates defect information corresponding to the extracted flat portion area, wherein:
the defect information corresponding to the flat portion area is generated based upon a value at a target pixel and an average value of a plurality of pixel values corresponding to pixels present within a predetermined range containing the target pixel in the image within the flat portion area, and
the defect information generating unit includes a relative ratio calculation unit that calculates a relative ratio of the value at the target pixel and the average value of the plurality of pixel values corresponding to the pixels present within the predetermined range containing the target pixel, and generates the defect information corresponding to the flat portion area based upon the calculated relative ratio.

2. An image processing apparatus according to claim 1, wherein:
the flat portion extraction unit executes edge extraction within the photographic image and extracts an area in which no edge is extracted as the flat portion area.

3. An image processing apparatus according to claim 2, wherein:
the edge extraction is executed by calculating differences corresponding to a plurality of distances between the target pixel and surrounding pixels along a plurality of directions.

4. An image processing apparatus according to claim 1, wherein:
the flat portion extraction unit includes a gradation conversion unit that executes gradation conversion on the photographic image and executes a flat portion area extraction on the photographic image having undergone the gradation conversion.

5. An image processing apparatus according to claim 4, wherein:
when gradation of the photographic image is indicated with a linear signal, the gradation conversion unit converts the linear signal to a nonlinear signal and executes conversion by enlarging the gradation on a low intensity side and compressing the gradation on a high intensity side.

6. An image processing apparatus according to claim 5, wherein:
the gradation conversion unit executes conversion by using a square root function.

7. An image processing apparatus according to claim 1, further comprising:
a reference image obtaining unit that obtains a reference image captured with the image sensor; and
a reference image defect information generating unit that generates defect information corresponding to the reference image, wherein:
the defect information generating unit generates the defect information corresponding to the flat portion area by using area information included in the defect information for the reference image and area information corresponding to the flat portion area in combination.

8. An image processing apparatus according to claim 7, wherein:
if an area is indicated to be a defect area by the defect information for the reference image, the flat portion extraction unit extracts the defect area as a flat portion area.

9. An image processing apparatus according to claim 8, further comprising:
a defect information conversion unit that converts the defect information for the reference image to defect information equivalent to defect information for a reference image photographed under optical conditions identical to optical conditions under which the photographic image has been photographed when the photographic image and the reference image have been photographed under different optical conditions, wherein:
the flat portion extraction unit uses the defect information for the reference image resulting from the conversion.

10. An image processing apparatus according to claim 9, wherein:
in consideration of an error in defect information conversion executed by the defect information conversion unit, the defect information generating unit expands the defect area indicated by the defect information for the reference image, at least by an extent corresponding to the error in the defect information conversion.

11. An image processing apparatus according to claim 8, wherein:
if there are a predetermined number of pixels or more pixels from which an edge has been extracted are present around the defect area indicated by the defect information for the reference image, the flat portion extraction unit does not extract the defect area as the flat portion area.

12. An image processing apparatus according to claim 11, wherein:
if an edge has been extracted from a majority of pixels among pixels present in a predetermined area surrounding a pixel in the defective area, the flat portion extraction unit does not extract the pixel in the defect area as a pixel in the flat portion area.

13. An image processing apparatus according to claim 7, wherein:
the defect information generating unit generates the defect information for an area indicated as a defect area by the defect information for the reference image and also determined to be the flat portion area.

14. An image processing apparatus according to claim 7, further comprising:
a defect information conversion unit that converts the defect information for the reference image to defect information equivalent to defect information for a reference image photographed under optical conditions identical to optical conditions under which the photographic image has been photographed when the photographic image and the reference image have been photographed under different optical conditions, wherein:
the defect information generating unit uses the defect information for the reference image resulting from the conversion.

15. An image processing apparatus according to claim 1, wherein:
the image obtaining unit obtains a plurality of photographic images captured with the image sensor;
the flat portion extraction unit extracts the flat portion area in each of the plurality of photographic images; and
the defect information generating unit generates defect information corresponding to the flat portion area in one of the plurality of images by using images of flat portion areas in the plurality of images having been extracted.

16. An image processing apparatus according to claim 1, wherein:
the image obtaining unit obtains a plurality of photographic images captured with the image sensor;
the flat portion extraction unit extracts the flat portion area in each of the plurality of photographic images; and
the defect information generating unit generates defect information corresponding to an entire image of each of the plurality of images by using images of flat portion areas in the plurality of images having been extracted.

17. An image processing apparatus according to claim 16, wherein:
the defect information corresponding to the flat portion area is generated based upon a value at the target pixel and an average value of a plurality of pixel values corresponding to pixels present within a predetermined range containing the target pixel in the image within the flat portion area.

18. An image processing apparatus according to claim 17, wherein:
the defect information generating unit includes a relative ratio calculation unit that calculates a relative ratio of the value at the target pixel and the average value of the plurality of pixel values corresponding to the pixels present within the predetermined range containing the target pixel, and generates the defect information corresponding to the flat portion area based upon the calculated relative ratio.

19. A non-transitory, computer readable recording medium, having an image processing program enabling a computer to execute functions of an image processing apparatus according to claim 1.

20. An image processing apparatus comprising:
an image obtaining unit that obtains a photographic image captured with an image sensor;
a flat portion extraction unit that extracts a flat portion area within the photographic image having been obtained;
a defect information generating unit that generates defect information corresponding to the flat portion area;
a correction unit that corrects an image within the flat portion area based upon the defect information; and
a relative ratio calculation unit that calculates a relative ratio of a value at a target pixel and an average value of pixel values corresponding to a plurality of pixels present within a predetermined range containing the target pixel, among pixels constituting an image of the flat portion area, wherein:
the defect information generating unit generates the defect information corresponding to the flat portion area based upon the relative ratio having been calculated; and
the correction unit uses a reciprocal of the relative ratio corresponding to a pixel in the image of the flat portion area when correcting a value of the corresponding pixel in the image of the flat portion area by multiplying the pixel value by the reciprocal.

21. An image processing apparatus according to claim 20, wherein:
the correction unit executes low pass processing on the relative ratio which has been generated as the defect information and corrects the value of the corresponding pixel in the image of the flat portion area by multiplying the pixel value by a reciprocal of the relative ratio having undergone the low pass processing, which corresponds to the pixel in the image of the flat portion area.

22. An image processing apparatus according to claim 20, further comprising:
a luminance level decision-making unit that makes a decision as to whether or not a luminance level of the photographic image is equal to or higher than a predetermined luminance level, wherein:
the correction unit executes correction for an area determined to be a flat portion area, where the luminance level is equal to or greater than the predetermined level.

* * * * *